(12) United States Patent
Wampler et al.

(10) Patent No.: US 12,531,464 B2
(45) Date of Patent: Jan. 20, 2026

(54) MAGNETIC DRIVE APPARATUS FOR TRANSLATING ROTATIONAL MOTION TO NUTATIONAL MOTION

(71) Applicant: Magvad LLC, Loomis, CA (US)

(72) Inventors: Richard Wampler, Loomis, CA (US); David Lancisi, Folsom, CA (US); Robert Mastromattei, Granite Bay, CA (US)

(73) Assignee: Magvad LLC, Loomis, CA (US)

( * ) Notice: Subject to any disclaimer, the term of this patent is extended or adjusted under 35 U.S.C. 154(b) by 417 days.

(21) Appl. No.: 18/332,940

(22) Filed: Jun. 12, 2023

(65) Prior Publication Data

US 2024/0413728 A1 Dec. 12, 2024

(51) Int. Cl.
*H02K 41/06* (2006.01)
*A61M 60/178* (2021.01)
(Continued)

(52) U.S. Cl.
CPC ......... *H02K 41/065* (2013.01); *A61M 60/178* (2021.01); *A61M 60/196* (2021.01); *A61M 60/253* (2021.01); *A61M 60/462* (2021.01); *A61M 60/835* (2021.01); *F04C 9/005* (2013.01); *F04C 15/0057* (2013.01)

(58) Field of Classification Search
CPC . H02K 41/065; A61M 60/196; A61M 60/462; A61M 60/835; A61M 60/422
See application file for complete search history.

(56) References Cited

U.S. PATENT DOCUMENTS

| 2,871,382 A | 1/1959 | Bouvier |
| 5,112,202 A | 5/1992 | Oshima |

(Continued)

FOREIGN PATENT DOCUMENTS

| AU | 2021105777 | 10/2021 |
| CN | 106817010 A | 6/2017 |

(Continued)

OTHER PUBLICATIONS

Abe, Yusuke, et al., "Third Model of the Undulation Pump Total Artificial Heart", ASAIO Journal 2003, pp. 123-127.
(Continued)

*Primary Examiner* — Eldon T Brockman
(74) *Attorney, Agent, or Firm* — O'BANION & RITCHEY LLP; John P. O'Banion

(57) ABSTRACT

A magnetic driver generates a magnetic field that rotates about an axis and induces nutation in a disc with an array of magnets (wobble plate). The magnetic driver can be a drive disc with an array of magnets and rotated by a drive motor, or can be electromagnetic coils sequentially energized, to provide the rotating magnetic field. The wobble plate nutates about the axis of the rotating magnetic field but is constrained from rotating about the axis. The wobble plate can be enclosed in a pump housing where nutation of the wobble plate causes pumping of a fluid to occur, such as in an implanted Left Ventricular Assist Device (LVAD) or a Total Artificial Heart (TAH). Driven in reverse, an input pumping fluid may induce nutation of the wobble plate which in turn induces rotary motion of a drive disc that drives a generator or a motor/generator.

32 Claims, 18 Drawing Sheets

(51) Int. Cl.
*A61M 60/196* (2021.01)
*A61M 60/253* (2021.01)
*A61M 60/462* (2021.01)
*A61M 60/835* (2021.01)
*F04C 9/00* (2006.01)
*F04C 15/00* (2006.01)

(56) References Cited

U.S. PATENT DOCUMENTS

| | | | |
|---|---|---|---|
| 5,178,515 A * | 1/1993 | Tsuchiya | A61M 60/546 |
| | | | 415/206 |
| 5,804,898 A | 9/1998 | Kawai | |
| 8,207,642 B2 | 6/2012 | Lafontaine | |
| 9,124,150 B2 | 9/2015 | Atmur | |
| 9,281,736 B2 * | 3/2016 | Atmur | H02K 41/065 |
| 9,404,489 B1 | 8/2016 | Atmur | |
| 9,863,480 B2 | 1/2018 | Puchhammer | |
| 10,574,109 B2 | 2/2020 | Atmur | |
| 11,870,319 B2 * | 1/2024 | Rubin | H02K 41/065 |
| 2004/0097861 A1 | 5/2004 | Abe | |
| 2011/0025152 A1 | 2/2011 | Lafontaine | |
| 2014/0285072 A1 | 9/2014 | Atmur | |
| 2015/0015174 A1 | 1/2015 | Atmur | |
| 2015/0369295 A1 | 12/2015 | Puchhammer | |
| 2016/0172929 A1 * | 6/2016 | Atmur | H02K 3/28 |
| | | | 310/37 |
| 2017/0317546 A1 | 11/2017 | Atmur | |

FOREIGN PATENT DOCUMENTS

| | | |
|---|---|---|
| CN | 107947525 | 4/2018 |
| DE | 10028964 | 1/2002 |
| DE | 102014001263 | 8/2015 |
| EP | 2782230 A2 | 9/2014 |
| WO | 2011078696 | 6/2011 |
| WO | 2012168682 | 12/2012 |
| WO | 2019226929 | 11/2019 |

OTHER PUBLICATIONS

Abe, Yusuke et al., "Advance in Animal Experiments with the Undulation Pump Total Artificial Heart: 50 and 54 Day Survival Periods with 1/R Control", ASAIO Journal 2003, pp. 325-332.
Chen, Gang, et al., "Design and Implementation of a Novel Passive Magnetically Levitated Nutation Blood Pump for the Ventricular-Assist Device", IEEE Access, Digital Object Identifier, vol. 7, 2019, pp. 1-11.
Chen, Gang, et al., "Levitation Stability of the Passive Magnetic Bearing in a Nutation Blood Pump", Sensors and Materials, vol. 33, No. 8, 2021, pp. 2665-2678.
Jian, Huang Ding, et al., "Design and realization of a novel magnetic nutation drive for industry robotic wrist reducer", Industrial Robot, vol. 44, No. 1, Jan. 2017, pp. 58-63.
Akamatsu, Teruaki, et al., "Development of nutating centrifugal blood pump", Artificial Heart 2, Chapter 12, Springer Japan 1988, pp. 107-108 plus citation page.
ISA/US, United States Patent and Trademark Office (USPTO), International Search Report and Written Opinion issued Oct. 18, 2024, related PCT international application No. PCT/US2024/032244, pp. 1-11, with claims searched, pp. 12-17.

* cited by examiner

MAGNETIC DRIVE APPARATUS FOR TRANSLATING ROTATIONAL MOTION TO NUTATIONAL MOTION

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND

1. Technical Field

The technology of this disclosure pertains generally to pumping liquids through a non-contact coupling, and more particularly to pumping blood by converting rotational motion to nutational motion using a non-contact magnetic coupling in the pump.

2. Background Discussion

Conversion of co-axial rotary motion to non-rotary motion and vise-versa is typically accomplished with mechanical devices such as gears, screw drives, and cranks. In hermetic devices, shaft seals required for mechanical actuators are problematic and of limited durability. Non-mechanical transmission of rotary motion to non-rotary motion would eliminate the need for such a shaft seal, and is typically accomplished with a magnetic or electromagnetic coupling. Such drives are currently limited to rotary-to-rotary couplings and have not been adapted to converting rotary motion to nutational motion.

Mechanical Circulatory Assistance

Existing mechanical circulatory assist devices are generally based on rotary blood pumps. The most commonly used device is the Heartmate III by Abbott Laboratories, 100 Abbott Park Road, Abbott Park, Il 60064. Although it supports the circulation very well, it does so at the expense of causing damage to circulating blood elements such as red blood cells and platelets (clotting cells), and furthermore depletes Van Willebrand factor (a clotting protein). Such damage can result in gastrointestinal bleeding and strokes. The blood damage is a result of the high velocities encountered in rotary blood pumps, which produce non-physiologic fluid shear stresses. These high velocities are in the range of 5 to 10 meters per second. In order to reduce these high velocities, it is necessary to employ a positive displacement pump. Early mechanical circulatory assist devices employed collapsing sacs or diaphragms actuated with pusher plates. These embodiments required artificial valves and have experienced limited durability.

Nutation may be defined as wobbling about an axis. A nutating disc within a housing can function as a positive displacement pump and does not require artificial valves when the nutating disc rotation is constrained.

Since the rotation of such a nutating disc is constrained, the pumped fluid velocities can be reduced to about $1/10^{th}$ of that found in a rotary pump, with the mechanical component velocities much lower, typically within a range of approximately 0.2 to 0.5 meters per second. This results in fluid shear velocities much lower than rotary blood pumps, and would be expected to result in significantly reduced blood damage, which would be similar to the range of physiologic fluid shear velocities found in the human aortic valve.

Nutating disc pumps have been implanted in goats for a period of 42 days as shown in "Advances in Animal Experiments with the Undulation Pump Total Artificial Heart; 50 and 54 Day Survival Periods with 1/R Control"; Abe, Chinzei, Isoyama, et al. ASAIO Journal 2003, hereinafter referred to as Abe. Abe describes a total artificial heart that was mechanically actuated using two nutating pumps. Although the device provided good circulatory support and low blood damage, the durability of the mechanical actuators was too limited for clinical use, being estimated at a lifetime of two years, and the project was abandoned. A nutating disc pump with a durable drive mechanism would have great utility as a mechanical circulatory assist device with the advantage of significantly less blood damage, and significantly longer lifetime.

BRIEF SUMMARY

This disclosure describes an apparatus that can transform rotary motion into nutational motion or, inversely, can transform nutational motion to rotary motion.

In one embodiment, a magnetic driver produces nutating motion of a wobble plate as a result of the interaction between magnets on the wobble plate and a rotating magnetic field generated by the magnetic driver. Such an apparatus could be used as a durable drive for a nutating disc pump for example.

In another embodiment, the apparatus produces rotary motion of a disc (driven disc) as a result of the interaction between magnets on a wobble plate (drive disc) and magnets on the driven disc.

In one embodiment, the apparatus can be used as a component of a pump that pumps a liquid such as blood. In another embodiment, the apparatus can be driven to produce electrical power, such as in a generator.

More particularly, this disclosure describes a magnetic "coupler" or "transmission" apparatus which employs pairs of permanent magnet arrays, or an array of electromagnets and an array of permanent magnets, to convert rotary motion to nutational motion, or to convert nutational motion to rotary motion, through magnetic coupling without the need for a mechanical transmission (gearing) or a connecting shaft. The apparatus can, for example, be used to convert rotary motion to nutation of a wobble plate in a housing with an inlet and outlet wherein the entire system can thereby function as a pump or turbine. One application would be the integration of the magnet architecture into an assembly to function as a pump of any liquid, including blood, with low fluid shear velocities. By appropriate design of such a pump, check valves are inherently unnecessary, removing one source of limited lifetime component failure. This consequently improves device lifetime.

In some embodiments described herein, an electric motor drives a magnetic coupling to produce a pumping action through nutating motion of a wobble plate. Alternatively, the wobble plate may be driven by a fluid flow, thereby generating input motion to the motor, which then acts as an electrical generator. In this alternative embodiment, the system may be used to measure fluid flow rates, or to otherwise generate power. Since the coupling between the motor or generator and the pump is magnetic, the motor or generator may be hermetically sealed and isolated from the pumping fluid. Such hermeticity is very desirable in biological implantation applications.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

By way of example, and not of limitation, this disclosure describes an apparatus that magnetically converts rotary motion to nutational motion, and further describes leveraging such motion conversion to pump a liquid such as, for example, blood in a total artificial heart (TAH) or an implanted left ventricular assist device (LVAD). Other applications are contemplated as well. For background information, nutational motion of a disk is similar to that of a spinning a coin on a table. The coin "nutates" about its center of mass. The Euler's disc is another such example. Nutation can occur with little to no rotation of the disk, or with rotation such as in a spinning top.

Figure 1A:
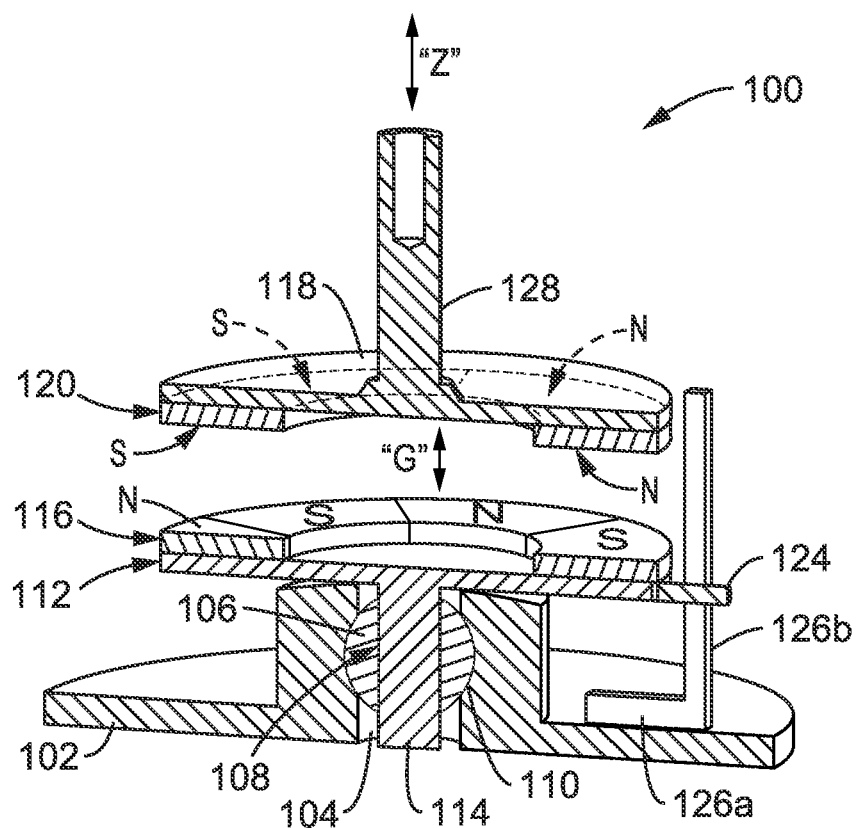
FIG. 1A is an isometric cross-sectional view of an embodiment of a magnetic coupler apparatus according to the technology of this disclosure that was used as an experimental test assembly to verify that the nutating motion can be achieved as intended.
Figure 1B:
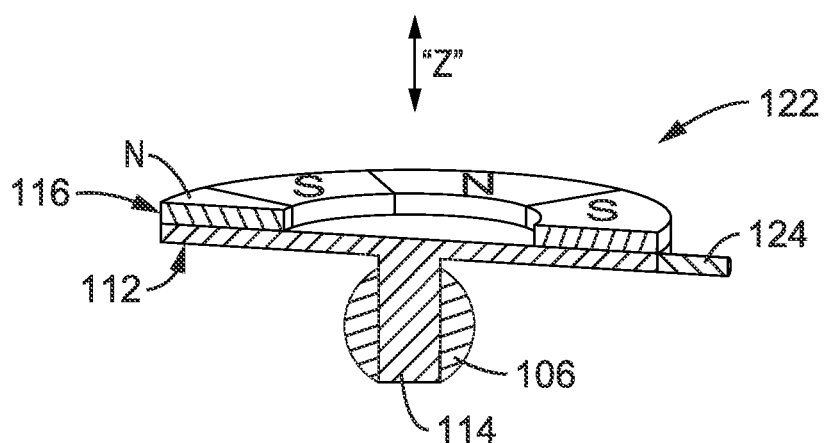
FIG. 1B is an isometric cross-sectional view of the lower disc assembly of FIG. 1A.

A generalized embodiment of a nutating magnetic coupler apparatus 100 according to the technology of this disclosure is illustrated in FIG. 1A and FIG. 1B. This embodiment represents a test assembly used for experimentation to demonstrate proof of concept.

As illustrated in FIG. 1A, this embodiment comprises a support base 102 with an axisymmetric bore 104. A spherical bearing 106 with a bore 108 passing therethrough is positioned in the bore 104 of the support base 102. The spherical bearing 106 is constrained in the bore 104 of the support base 102 by an inner convex spherical surface 110 in the support base 102 having a curvature that conforms to the curvature of the outer surface of the spherical bearing 106. Consequently, the spherical bearing 106 cannot translate in any direction, but can rotate within the bore 104 of the support base 102 within a limited range of motion.

The apparatus also includes a "nutating" disc which is illustrated as the lower disc 112 in FIG. 1A. In this embodiment, the disc 112 has a shaft 114 that extends from the lower surface of the disc and passes through the bore 108 in the spherical bearing 106. Attached to the upper surface of the disc 112 is an array 116 of magnets that have poles that alternate in magnetic field polarity. The alternating poles are denoted using "N" and "S" to refer to the north and south poles of the magnets, respectively. The magnets are axially polarized such that the magnetic field lines emanate away from the face of the magnets (e.g., into the gap "G").

The apparatus also includes a disc 118 that is rotatable. Attached to the lower surface of the disc 118 is an array 120 of magnets that have poles that alternate in magnetic field polarity. The alternating poles are denoted using "N" and "S" in hidden lines to refer to the north and south poles, respectively, of the magnets beneath the disc 118. As with the magnet array 116, the magnets in array 120 are axially polarized such that the magnetic field lines emanate away from the face of the magnets (e.g., into the gap "G").

As illustrated, discs 112 and 118 are spaced apart such that the magnet arrays 116, 120 are also spaced apart with the gap "G" therebetween. It is important that the arrays of magnets are not in physical contact with each other.

In the preferred embodiment, there is an even number of alternating magnetic poles in each array of magnets and the number of magnetic poles in array 116 differs from the number of magnetic poles in array 120 by at least two. In other words, the number of magnetic poles preferably should differ by multiples of two. However, while this is the preferred configuration, the array configurations are not limited to these relationships.

In this particular embodiment, the magnets are arranged such that the upper magnet array 120 has a 4-pole magnet arrangement, and the lower magnet array 116 has a 6-pole arrangement. As the upper magnet array 120 (4-pole array) is rotated about a central axis extending through the shaft 128 (designated as the "Z" axis), the lower magnet array 116 (6-pole array) will in turn nutate about the "Z"-axis as any one magnet in the lower magnet array 116 (on disc 112) is alternately attracted and repelled as the upper magnet array 120 (on disc 118) rotates. In this disclosure we use the notation "Z"-axis to refer to an axis that extends through the center of the drive disc and through the center of the wobble disc such that when the faces of the two disc lie in parallel planes the two discs are coaxial aligned. Typically, this is the longitudinal axis through the shaft on the drive plate. This notation applies as well to the positional and axial relationship between drive plates, wobble plates, magnetic drivers, electromagnetic drivers, and housing components that are described in this disclosure.

With a 4-pole and 6-pole combination, as illustrated here, nutation of the disc 112 results from magnet interactions between the lower magnet array 116 and the upper magnet array 120. As disc 118 rotates, the magnetic fields in the air gap "G" will change from up to full attraction (e.g., where opposite poles are exactly aligned) to up to full repulsion (e.g., where like poles are exactly aligned) with varying field gradients in-between. The disc 112 will thusly nutate about the "Z"-axis. In this particular embodiment, the disc 112 will nutate twice for one complete rotation of the disc 118. Note that the nutation "ratio" is a function of the relative number of magnets on each disc. For example, a different ratio would be achieved if four poles were on disc 112 and six poles were on disc 118. Note also that when referring to nutating once, twice, three times, etc. we are referring to the number of 360-degree nutation cycles that are completed.

FIG. 1B illustrates the lower nutating assembly 122 that comprises the spherical bearing 106, the disc 112, the magnet array 116, and the shaft 114. It is important to note that the assembly 122 will nutate about the "Z"-axis but is constrained from rotating about the "Z"-axis by an anti-rotation mechanism. In the embodiment shown, the anti-rotation mechanism comprises a pin 124 and a pair of pillars 126a, 126b that are attached to the base 102. One end of the pin 124 is connected to the disc 112 and the other end is positioned between the pillars 126a, 126b. The pin 124 and pillars 126a, 126b prevent the disc 112 from rotating about the "Z"-axis but allow the disc 112 to nutate. In contrast, disc 118 is attached to a shaft 128 that allows rotational motion to be applied to the disc 118 while constraining nutation of disc 118.

Note also that in FIG. 1A and FIG. 1B the shaft 114 extends through the spherical bearing 106. However, instead of coupling the spherical bearing 106 to the disc 112 using a shaft, the spherical bearing could be connected to the underside of the disc 112 or could extend through a central opening in disc 112 and attach to the disc 112 at the interface.

Based on the foregoing discussion, we may also sometimes refer to the nutating disc as a "wobble disc" and the combination of the nutating disc and a magnet array as a "wobble plate". Additionally, we may also sometimes refer to the rotatable disc as a "drive disc" and the combination of the drive disc and a magnet array as a "drive plate". Various embodiments of wobble discs, wobble plates, drive discs and drive plates are illustrated in this disclosure. Furthermore, note that a drive plate or a wobble plate need not comprise a disc with arcuate magnets attached to the disc but could alternatively comprise a disc with zonally magnetized segments in the disc. Additionally, the drive disc and the wobble disc can be made from a magnetically conductive material to complete a magnetic circuit on the opposite sides of the magnetic poles to enhance the magnetic fields in the air gap "G" from the magnetic poles.

Figure 2:
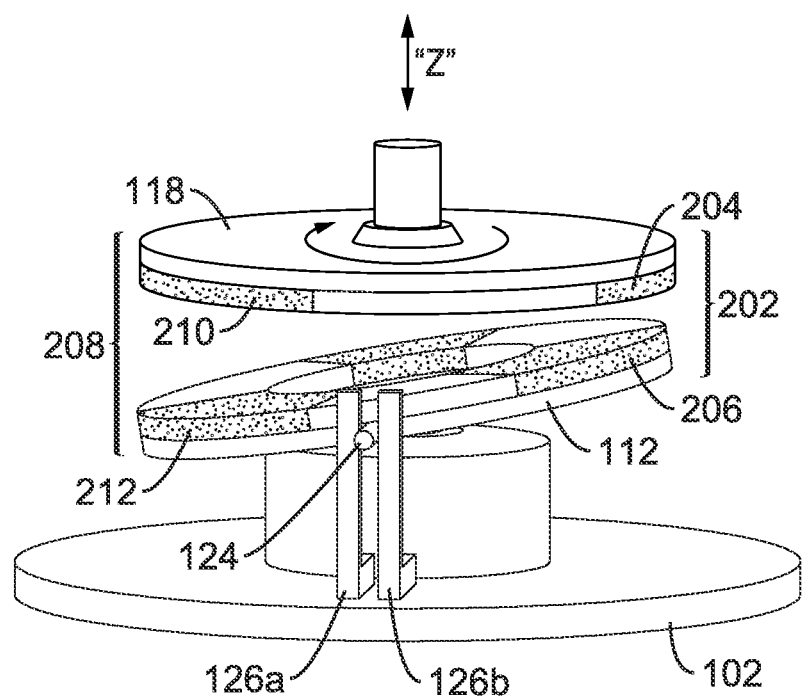
FIG. 2 is an isometric view of the apparatus of FIG. 1A and FIG. 1B highlighting the wobbling motion of the wobble disc.

FIG. 2 shows an assembled view of the components shown above in FIG. 1A and FIG. 1B. When the disc 118 is rotated in a clockwise direction as indicated by the arrow, the combination 202 of opposite poles 204, 206 facing each other results in an attractive force which creates a counterclockwise moment. Furthermore, the combination 208 of like poles 210, 212 facing each other results in a repulsive force which also creates a counterclockwise moment. Since the moments are both counterclockwise, the combination is additive. This combination creates a counterclockwise moment in the disc 112 that in turn creates counterclockwise nutational motion of the disc 112 about the "Z"-axis.

Figure 3A:
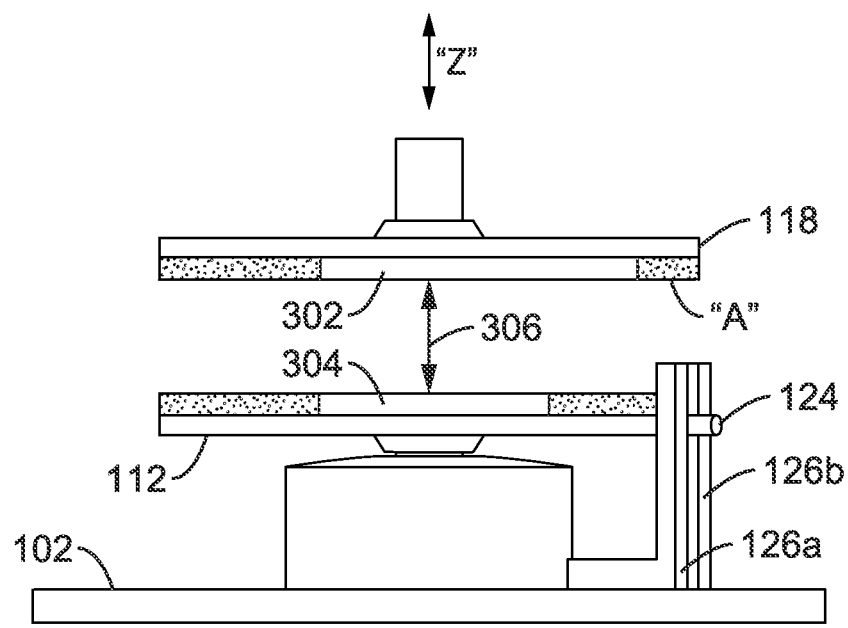
FIG. 3A and FIG. 3B are rotated side views of the device depicted in FIG. 2, showing attraction and repulsion between the wobble disc and the drive disc.
Figure 3B:
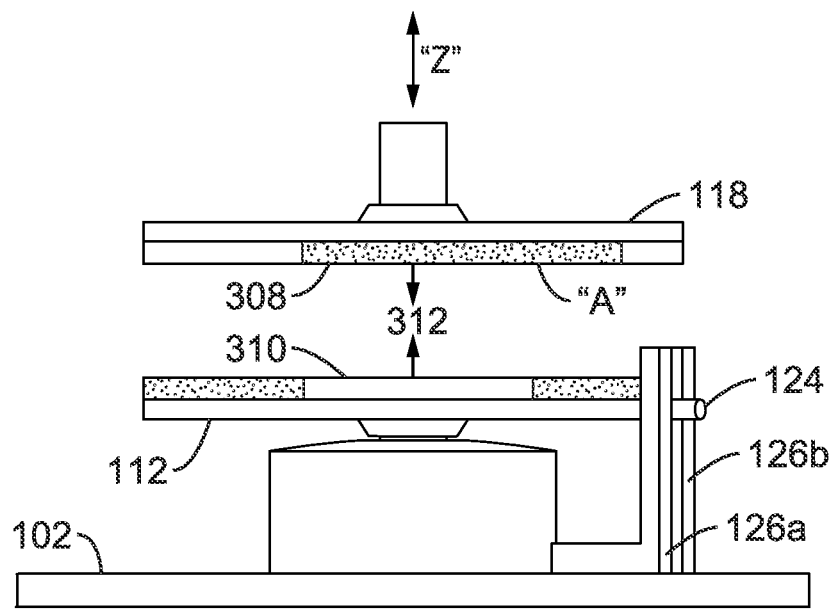

FIG. 3A and FIG. 3B are rotated side views of the apparatus depicted in FIG. 2. In FIG. 3A, the opposed magnets 302, 304 on the disc 118 (rotating disc) and the disc 112 (non-rotating, nutating disc), respectively, are of the same polarity, and will therefore create a repulsive force as shown by the arrow 306. For ease of reference, the different magnet polarities are indicated by stippled and non-stippled areas to represent north and south poles, respectively. Because disc 118 is configured to rotate, the net effect of the repulsive force is to push the disc 112 away from disc 118 in the area of the repulsive field. In FIG. 3B, the disc 118 has rotated from the previous position shown in FIG. 3A. By comparing the positions of disc 118 in FIG. 3A and FIG. 3B, it can be seen that the magnet "A" has moved to the left in FIG. 3B, indicating rotation of disc 118. In FIG. 3B, the opposed magnets 308, 310 on the disc 302 and the disc 304, respectively, have an opposite polarity and will therefore create an attractive force as shown by the arrow 312. The net effect of these attractive forces is to pull the disc 112 upward toward disc 118 in the area of the attractive field. As the disc 118 continues to rotate, the orientation of the magnetic moments moves between attraction and repulsion, and thereby creates a nutating motion in the disc 112.

Figure 4:
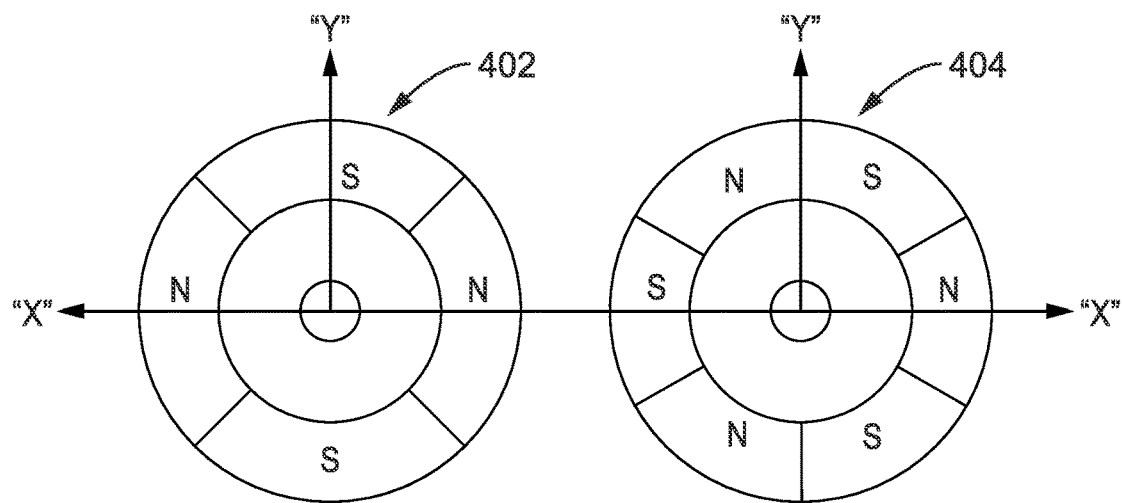
FIG. 4 is a schematic of a magnetic pole arrangement where the upper magnet array has 4 magnet poles and the lower magnet array has 6 magnet poles.
Figure 5:
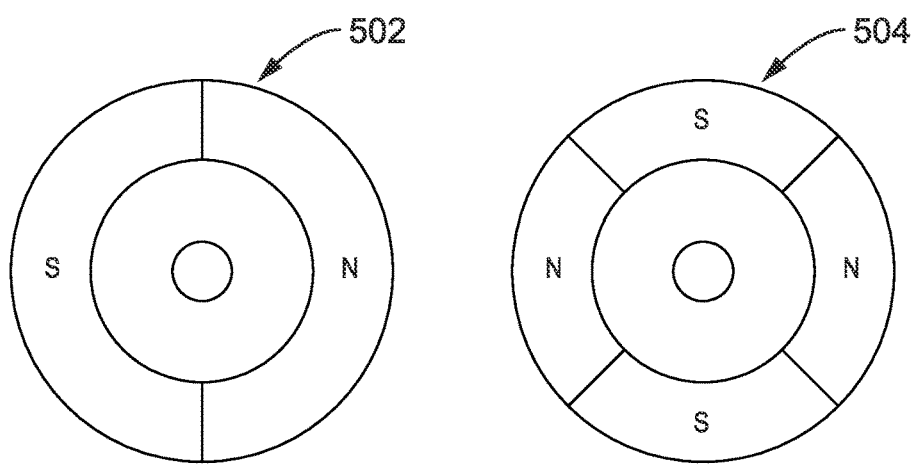
FIG. 5 is a schematic of a magnetic pole arrangement where the upper magnet array has 2 magnet poles and the lower magnet array has 4 magnet poles.
Figure 6:
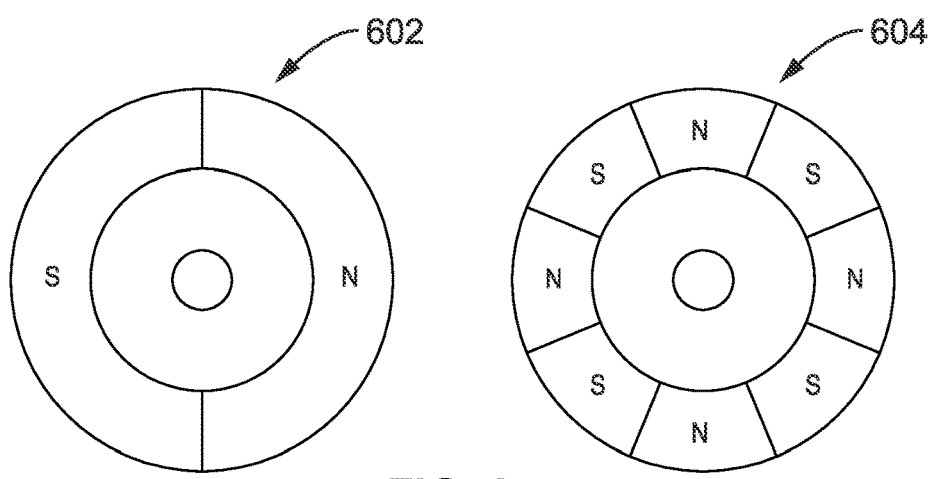
FIG. 6 is a schematic of a magnetic pole arrangement where the upper magnet array has 2 magnet poles and the lower magnet array has 8 magnet poles.

FIG. 4 through FIG. 6 schematically illustrate examples of layouts for the magnet arrays on the drive disc and the wobble disc. For reference, FIG. 4 shows an "X"-axis and a "Y"-axis which lie in the plane of the discs. The "Z"-axis would be the orthogonal axis looking into the center of the discs. The magnetic moment is about a line of the "X"-"Y" plane but the nutation is about the "Z"-axis.

In FIG. 4, the upper (drive) magnet array 402 has 4-poles and the lower (nutating) magnet array 404 has 6-poles. As can be seen, at the 3 o'clock position the opposed polarities are the same and thus produce a repulsive force and a moment about the "Y"-axis. At the 9 o'clock position the poles are opposite and attractive and thus a moment about the "Y"-axis would result. Accordingly, the nutation wave will move in the opposite direction of the rotation of the 4-pole magnet array.

Note that, with this configuration of magnetic poles, a single 360-degree rotation of the disc with array 402 (the drive disc) will cause two full nutations of the disc with array 404 (the wobble disc). As the drive disc with the 4-pole magnet array 402 rotates, there will be one complete nutation of the wobble disc with the 6-pole magnet array for every pole pair excursion of the 4-pole magnet array 402. Because there is a quantity of 2-pole pairs in the magnet array 402, the 6-pole magnet array 404 will nutate twice for every 360-degree rotation of the 4-pole magnet array 402. Additionally, the nutational motion of magnet array 404 will be in the opposite direction of the rotation of magnet array 402; e.g., clockwise rotation of the drive disc will produce counterclockwise nutation of the wobble disc.

We refer to the relationship between the number of nutation cycles created by a complete rotation of the drive disc as the "magnetic gear ratio". In this example, the magnetic gear ratio is 1:2. If, for example, we were to reverse the arrays such that there are six poles on the drive disc and four poles on the wobble disc, the gear ratio would be 1:3; that is, there would be three nutations for each complete rotation of the drive disc.

In FIG. 5, the drive magnet array 502 has 2-poles and the nutating magnet array 504 has 4-poles. Here, there would be a total of two nutations of the nutating magnet array 504 for a complete revolution of the drive magnet array 502. It can be seen from FIG. 5, that this combination will work as there are "similar" opposing poles at the 3 o'clock position and dissimilar opposing poles at the 9 o'clock position). At the 12 o'clock and 6 o'clock positions, the poles are split between a north and south, so there will be no net moment contribution at these locations In FIG. 6, drive magnet array 602 has 2-poles and the nutating magnet array 604 has 8-poles. In this example, the device nutation would not work as well, as the pole pieces are of very different sizes and the net moment contribution will not be as great. The north pole face of the 2-pole drive disc will cover the 8-pole north magnet at the 3 o'clock position, but it will also cover a quantity of two south poles. This will lead to a diminished force and as such, this combination will not work well, if at all.

Figure 7:
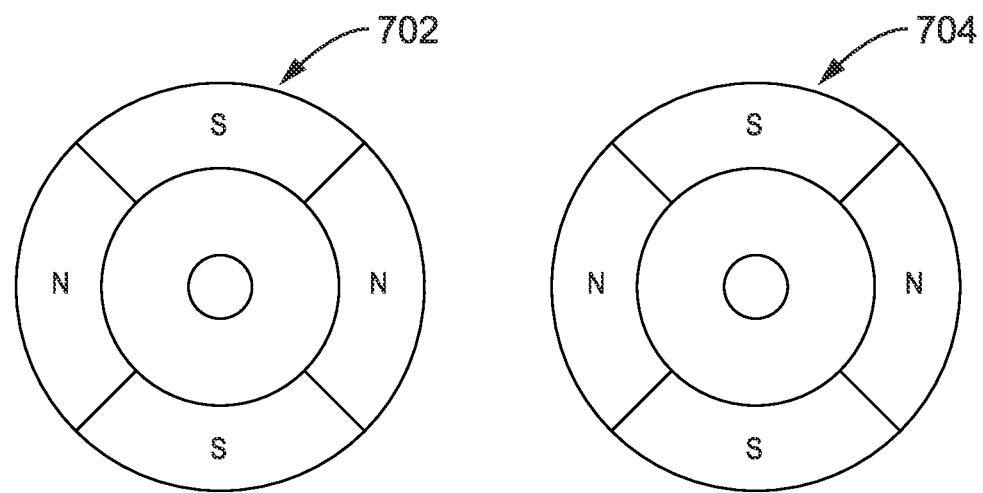
FIG. 7 is a schematic of a magnetic pole arrangement where both the upper and lower magnet arrays have 4 magnet poles.

In contrast, the configuration shown in FIG. 7 where the drive magnet array 702 has 4-poles and the magnet array 704 also has 4-poles will not function because rotating the drive magnet array will not create sufficient magnetic field gradients to cause nutation. As explained above, for nutation to take place, there needs to be a difference in the number of poles between the discs of at least two.

It can be concluded here that a nutation motion can be made by using certain combinations of multi-pole magnetic array assemblies facing each other where one of them purely rotates, causing the other to nutate. Rotation of the nutating disc may be prevented via the use of anti-rotation pin and pillar mechanical parts. The frequency of these nutating motions will depend on the number of poles in the magnet arrays. Also, the direction of nutation will be the opposite of the direction of the input rotation.

As a further example of the nutation the nutational motion that is produced, reference can be made to FIG. 8A through FIG. 8I, which is a series of frames progressing as a 4-pole drive disc 802 rotates about 22.5° per frame in a clockwise direction with corresponding movement of a 6-pole wobble disc 804 in the counterclockwise direction, and showing the anti-rotation pin 806 moving up and down in slot 808. In this set of figures, the mechanical configuration corresponds to that shown in FIG. 1A, FIG. 1B, FIG. 2, FIG. 3A and FIG. 3B with the magnetic array layout shown in FIG. 4. For purposes of presentation, different reference numbers are used in FIG. 11 than used in those figures.

Figure 8A:
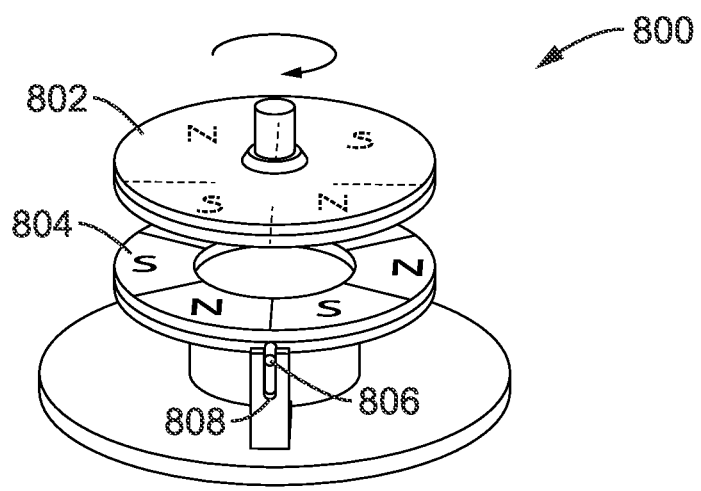
FIG. 8A through FIG. 8I are a series of frames progressing as the drive plate rotates clockwise about 22.5° per frame for one-half revolution, with corresponding counterclockwise nutation of the wobble plate, and also showing the anti-rotation pin moving up and down in a slot, where the arrangement of interacting magnetic poles on the drive plate and wobble plate corresponds to FIG. 4.

FIG. 8A shows position 800 where the drive disc 802 is rotationally aligned with the slot 808 at 0°, and the anti-rotation pin 806 is at the upper end of the slot 808. Viewed from the front, this is the position of a maximum attraction between the drive plate and the wobble plate.

Figure 8B:
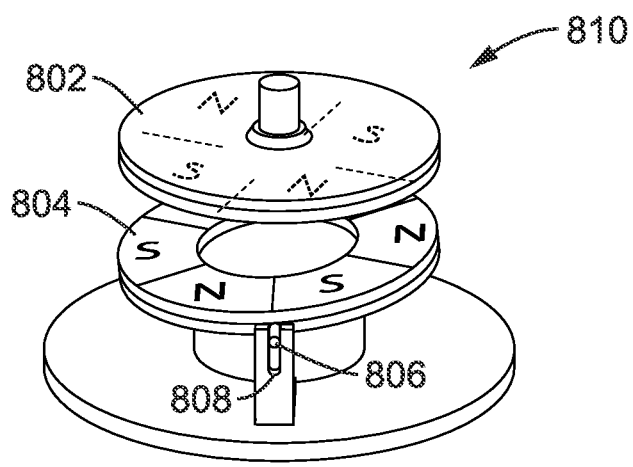

FIG. 8B shows position 810 where the drive disc 802 is rotationally offset from the slot 808 clockwise by 22.5°, and the anti-rotation pin 806 is moving downward toward the bottom of slot 808.

Figure 8C:
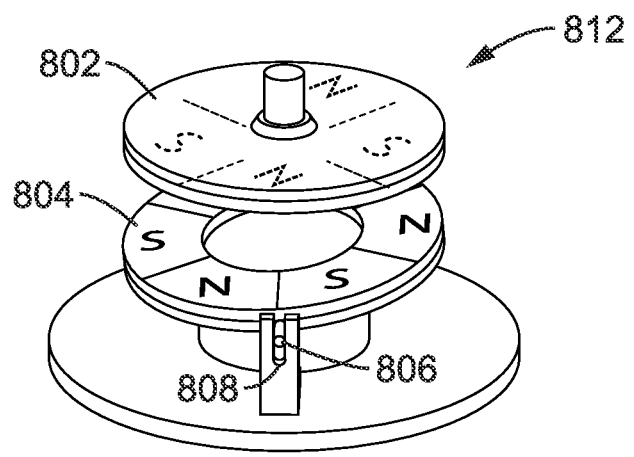

FIG. 8C shows position 812 where the drive disc 802 is rotationally offset from the slot 808 clockwise by 45°, and the anti-rotation pin 1106 is moving further downward toward the bottom of the slot 808.

Figure 8D:
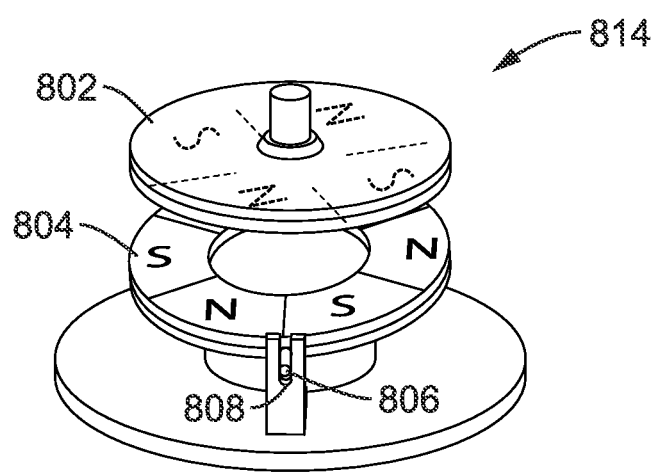

FIG. 8D shows position 814 where the drive disc 802 rotationally offset from the slot 808 clockwise by 67.5°, and the anti-rotation pin 1106 is moving still further downward toward the bottom of the slot 808.

Figure 8E:
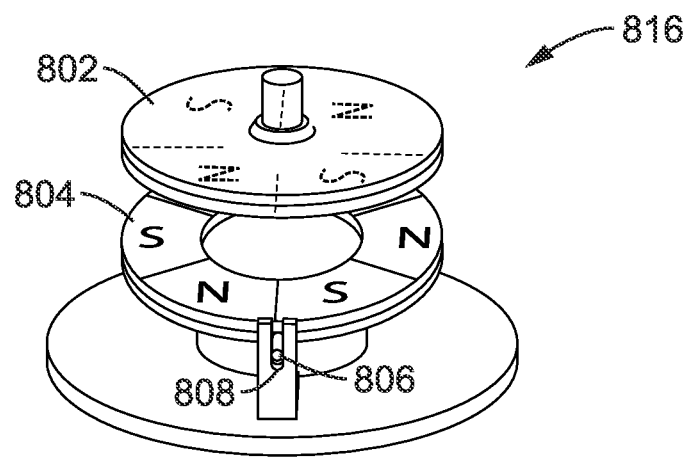

FIG. 8E shows position 816 where the drive disc 802 is rotationally offset from the slot 808 clockwise by 90°, and the anti-rotation pin 1106 has moved to the downward-most position in the slot 808. Viewed from the front, this is the position of maximum repulsion between the drive plate and wobble plate.

Figure 8F:
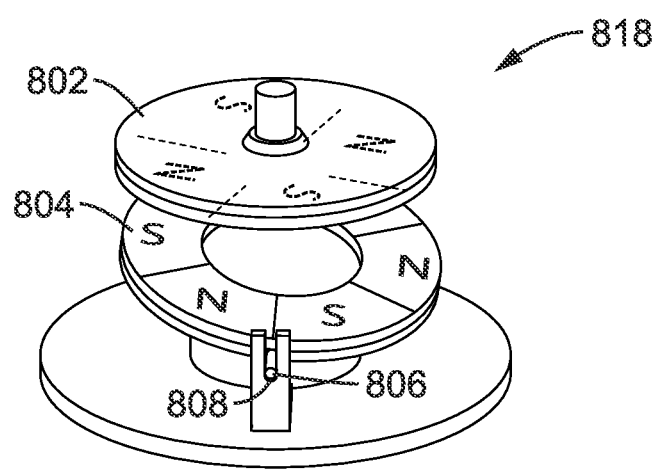

FIG. 8F shows position 818 where the drive disc 802 is rotationally offset from the slot 808 clockwise by 112.5°, and the anti-rotation pin 806 is moving upward from the bottom of the slot 808.

Figure 8G:
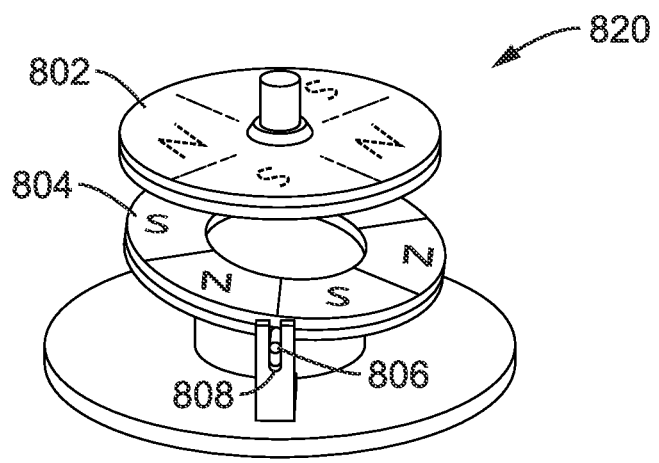

FIG. 8G shows position 820 where the drive disc 808 is rotationally offset from the slot 808 clockwise by 135°, and the anti-rotation pin 806 is moving further upward from the bottom of the slot 808.

Figure 8H:
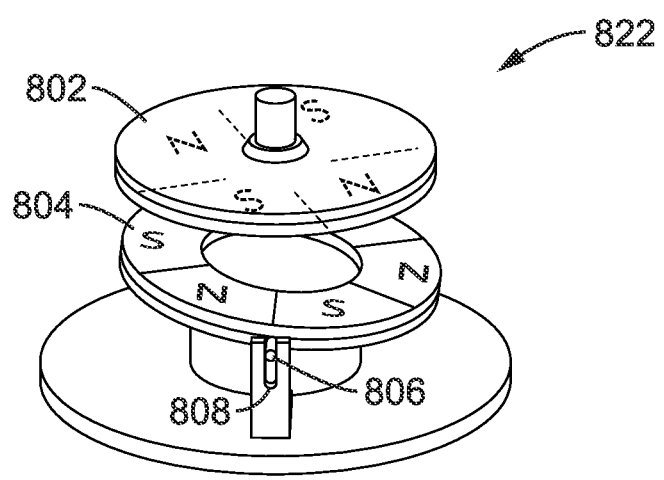

FIG. 8H shows position 822 where the drive disc 802 is rotationally offset from the slot 808 clockwise by 157.5°, and the anti-rotation pin 806 is moving still further upward from the bottom of the slot 808.

Figure 8I:
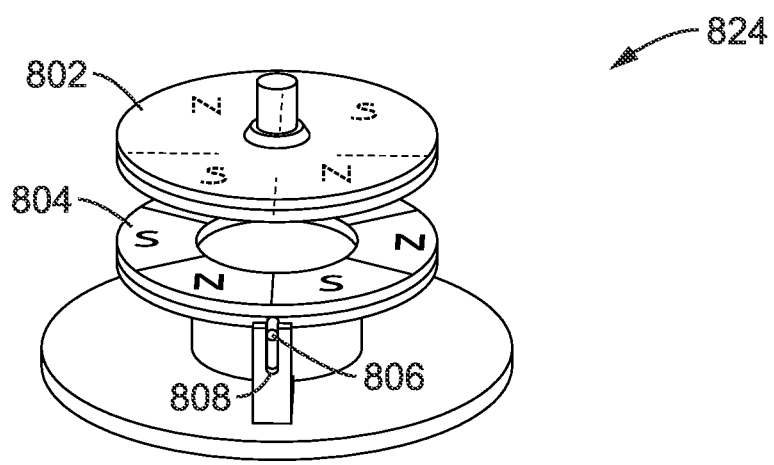

FIG. 8I shows position 824 where the drive disc 802 is rotationally offset from the slot 808 clockwise by 180°, and the anti-rotation pin 806 has moved to the upper end of the slot 808. This is the end of a complete nutation cycle and, as in FIG. 8A, a position of maximum attraction between the drive plate and the wobble plate.

Figure 9:
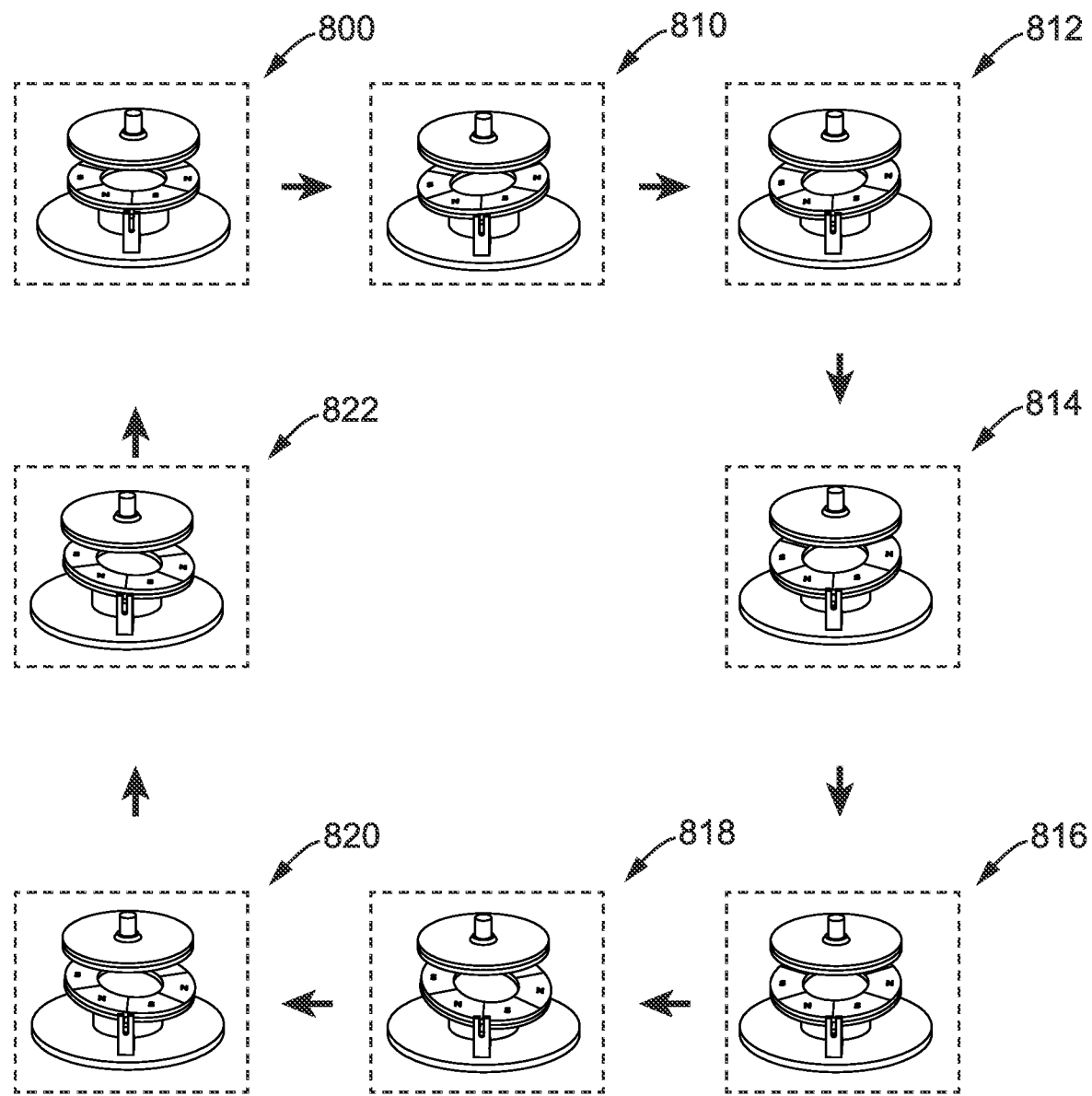
FIG. 9 summarizes the nutation motion of the wobble plate shown in the frames of FIG. 8A through FIG. 8I and illustrates the one complete nutation cycle that results from the one-half revolution of the drive plate.

FIG. 9 visually summarizes the motion of the wobble disc and anti-rotation pin shown in FIG. 8A through FIG. 8I in response to clockwise rotation of the drive disc.

With the foregoing in mind, conversion of rotational motion into nutational motion through magnetic coupling as described herein can be leveraged for use in many applications. An example of one such application is presented in FIG. 10 which illustrates a type of blood pump system 1000 for medical use. In this embodiment, the system comprises an implantable blood pump 1002 and an external controller/power supply 1044. Such a blood pump 1002 may be, for example, a Left Ventricular Assist Device (LVAD).

In this embodiment, the pump 1002 includes a housing assembly 1004 that has an upper section 1006 and lower section 1008 and a radial inlet 1010 and a radial outlet 1012. Depending upon the application, the housing assembly 1004 could be fabricated from a number of metals, ceramics or polymers. For medical implantation one preferred composition would be titanium 6AL-4V alloy (containing 6% aluminum and 4% vanadium). Ideally, the housing should have high electrical resistance or be non-conductive to minimize eddy current losses.

A motor housing 1014 contains a drive motor 1016 that rotates a drive disc 1018 and associated drive magnet array 1020. The magnets could be any permanent magnet material such as neodymium iron boron. In another embodiment (not shown), the rotating drive magnet array 1020 and motor 1016 could be replaced with electromagnetic coils sequenced correctly to provide a rotating magnetic field. In a further alternative embodiment (not shown), the drive motor 1016 could be replaced with a stator to directly drive the magnet array 1020.

A pumping housing 1022, is defined by a concentric wall 1024 and two convex, conical surfaces 1026, 1028, respectively, on the upper housing section 1006 and the lower housing section 1008. The surfaces of the cones have an included angle 1030 which may be between about 10 degrees to about 50 degrees. A wobble plate 1032 is contained within the pumping housing 1022. A pump permanent magnet array 1034 is mounted within or on the wobble plate 1032. The wobble plate 1032 is constructed about a spherical bearing 1036 at its center.

Channels 1038 on the surface of the spherical bearing 1036 provide for a small amount of leakage between the two sides of the wobble plate 1032 to provide for lubrication of the interface (fluid gap) between the spherical bearing and the bearing cups 1040, 1042. A pressure differential between the sides of the wobble plate will push blood into the fluid gap and reduce the residence time of the blood in the fluid gap. In the application of a blood pump, these channels would mitigate stasis and clotting in the fluid gap.

The spherical bearing 1036 is constrained by an upper hemispheric bearing cup 1040 and a lower hemispheric bearing cup 1042, respectively, on the upper housing 1006 and lower housing 1008. An external controller 1044 contains motor circuitry 1046 and a battery 1048. The external controller 1044 is connected to the drive motor 1016 by wires 1050 via a hermetically sealed feedthrough 1052 on the surface 1054 of the motor housing 1014.

Note that the apparatus can be adapted to a wide range of flows and pressures. For example, the flow can be defined by multiplying the nutation rate times the volume of the pumping housing. A person with ordinary skill in the art of hydrostatics can determine the axial force required to actuate the nutating disc based on the required pressure and the area of the nutating disc. Furthermore, the magnetic architecture of the magnet array and required magnet strength may be calculated by a person of ordinary skill in the art of magnetics.

Figure 11:
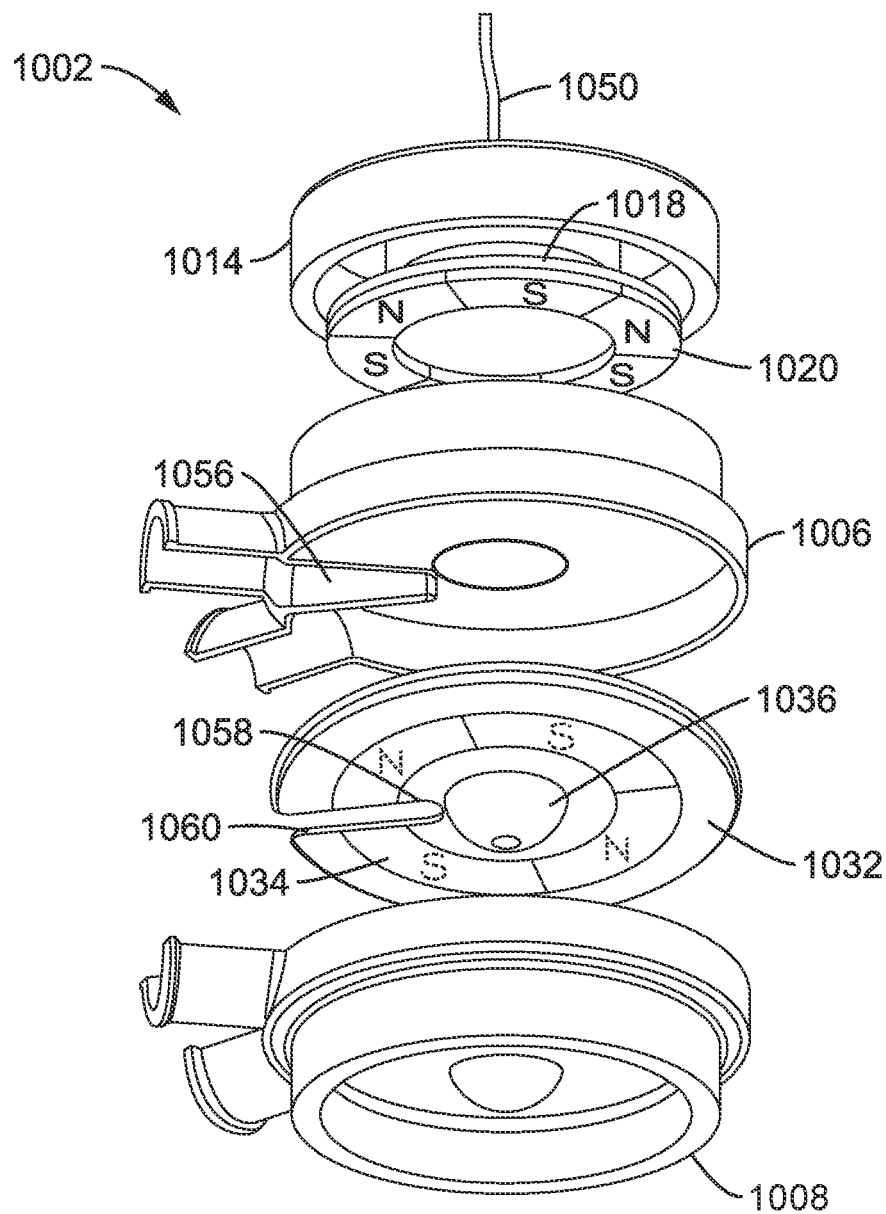
FIG. 11 is an exploded view of the pump of FIG. 10.

Referring also to the exploded view of pump 1002 in FIG. 11, a partition 1056 extends from the conical surfaces of the pump housings, serving to separate the inlet from the outlet to ensure unidirectional flow. A matching slot 1058 in the wobble plate 1032 allows for the wobble plate 1032 to tilt freely during wobbling motion and may also serve to constrain rotary motion of the wobble plate 1032.

The partition 1056 is a mechanical feature similar in function to pin 124 and pillars 126a, 126b previously described, which acts to constrain the wobble plate 1032 from rotating about the "Z"-axis. The material of the partition 1056 and the inner edge 1060 of the slot 1058 should be a tribological combination suitable for a bearing surface. Another embodiment would consist of a magnetic or hydrodynamic method of anti-rotation.

In this embodiment, there is no substantial rotation of the wobble plate 1032 about the "Z"-axis. Additionally, there is no translation of the spherical bearing 1036.

FIG. 11 also shows additional details of the drive magnet array 1020 and nutating magnet array 1034. While a number of magnet arrays are possible as described above, in this embodiment the drive disc 1018 (to which is attached drive magnet array 1020) comprises six axially oriented magnets and the nutating magnet array 1034 (which is incorporated into the nutating disc to form a wobble plate 1032 in this embodiment) has four axially oriented magnets. This arrangement would provide for three nutation cycles of the wobble plate 1032 for every complete rotation of the drive magnet array 1020, for a 1:3 magnetic drive ratio. Alternatively, for example, the drive magnet array could comprise four magnets and wobble plate comprising six magnets for a magnetic drive ratio of 1:2.

Figure 10:
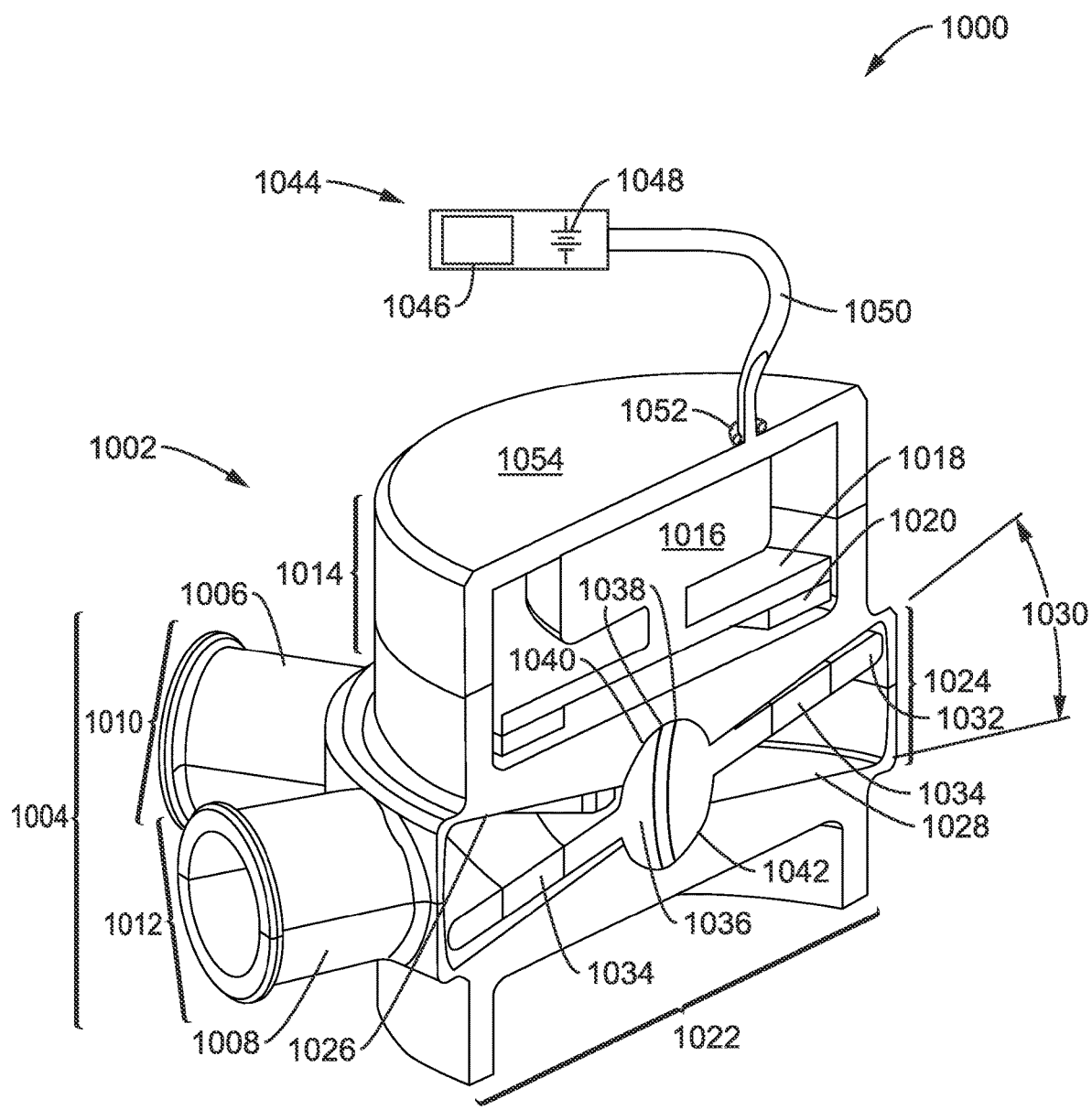
FIG. 10 is a cross-section of an isometric view through a pump according to an embodiment of the presented technology, which may act as a left vascular assist device (LVAD).
Figure 12:
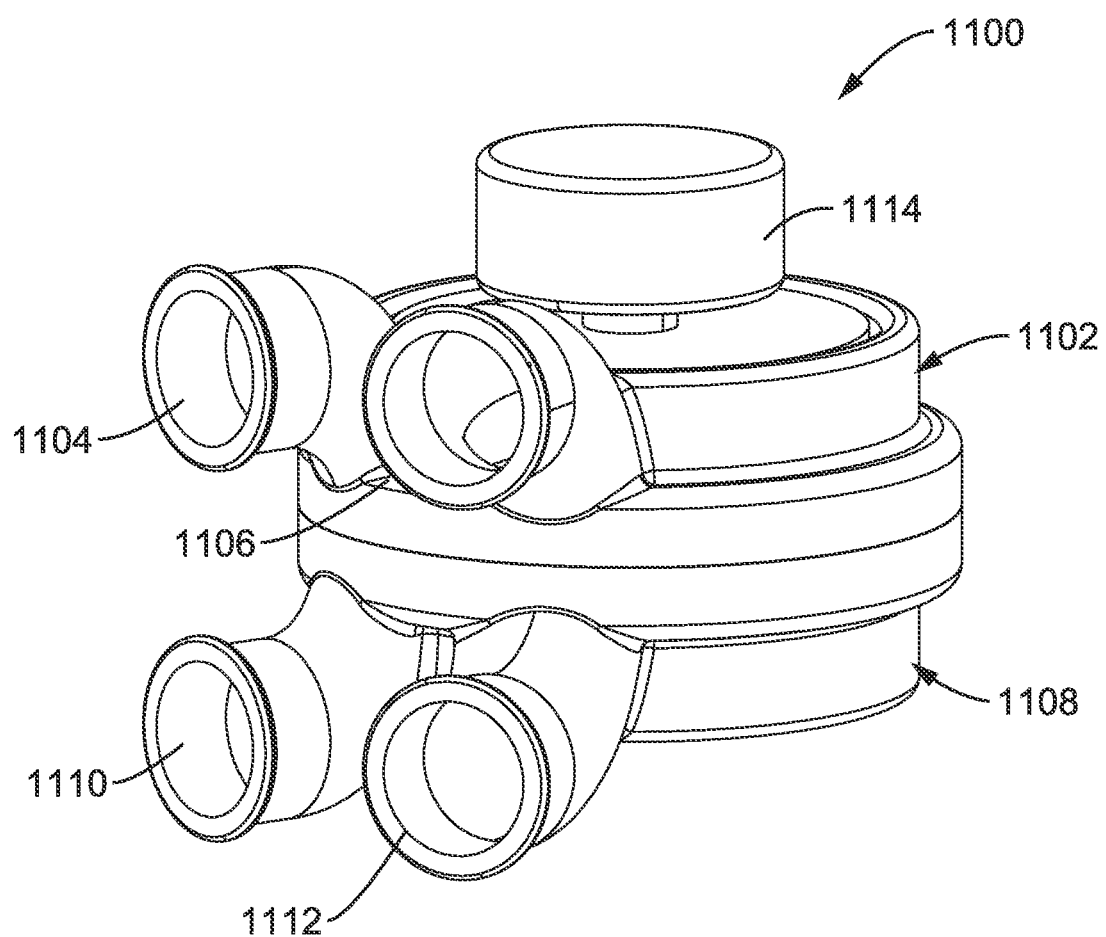
FIG. 12 is an isometric view of an adaptation of the pump shown in FIG. 10 and FIG. 11 to function as two parallel pumps in one embodiment of a total artificial heart (TAH).

FIG. 12 illustrates a pump embodiment 1100 that adapts the pump configuration illustrated in FIG. 10 and FIG. 11 to function as two parallel pumps sharing a single wobble plate. One application would be for use as a total artificial heart (TAH), where one side (first pump section) would provide blood flow to the lungs and the other side (second pump section) would provide blood flow for systemic circulation. As in the previous pump, a variety of magnet arrays may be used. In order to function as two parallel pumps, the inlets and outlets should be located on the flat surfaces of the housing. The upper housing 1102 includes an inlet 1104 with a corresponding outlet 1106, and the lower housing 1008 includes an inlet 1110 with a corresponding outlet 1110. The direction of rotation will determine which is the inlet and which is the outlet. With the inlets and outlets suitably configured as described, a single nutating disc will act as two parallel pumps operating through the four ports. The nutating motion of the disc, induced by rotation of the external motor 1114, would cause the disc to act as a positive displacement pump in the same fashion as previously shown in FIG. 10 and FIG. 11. The two parallel pumps would be 180-degrees out of phase, so that while one side is pumping the other side will be filling. The flow rate will be the stroke volume of the wobble plate times the number of nutations per minute.

Figure 13:
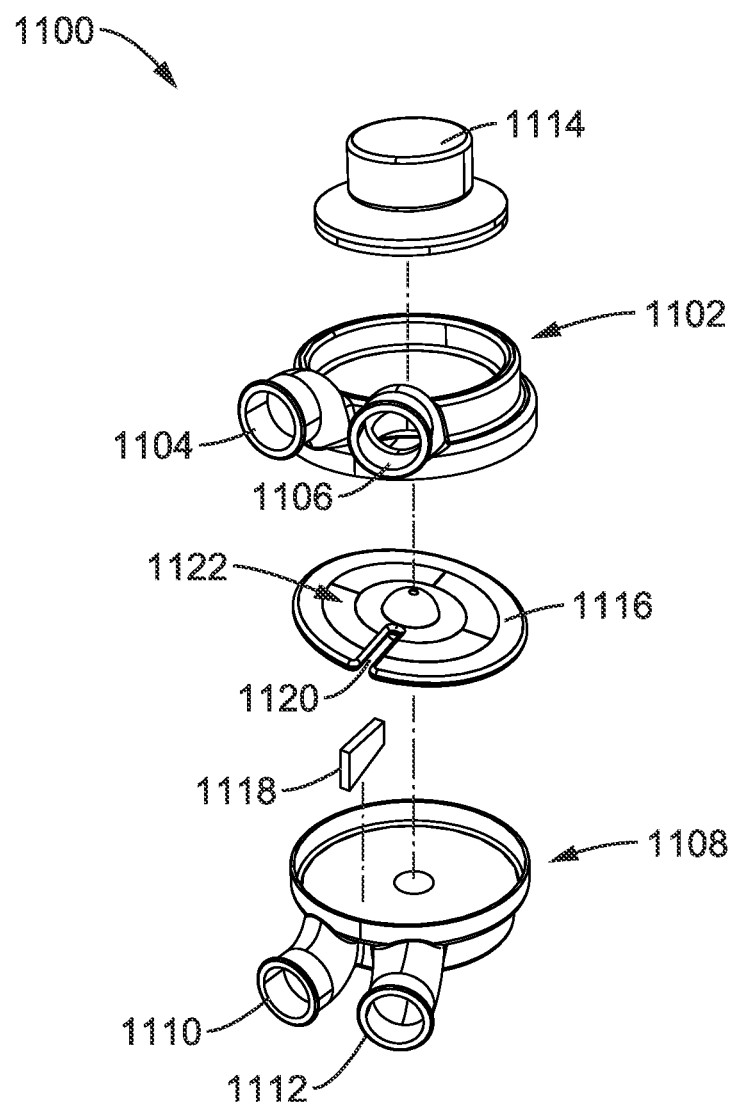
FIG. 13 is an exploded view of the pump of FIG. 12.

FIG. 13 is an exploded view of the pump shown in FIG. 12. This figure shows the wobble plate 1116, as well as a tapered partition 1118 that extends from the upper wobble chamber section 1102 to the lower wobble chamber section 1108 through a slot 1120, and that partially passes radially through the wobble plate 1116. This tapered partition 1118 acts as a hydraulic barrier between the upper wobble chamber section 1102 ports 1104, 1106 and the lower wobble chamber section 1108 ports 1110, 1112. The tapered partition 1118 additionally acts as an anti-rotation device, preventing substantial rotation of the wobble plate 1116. In this configuration, a single wobble plate 1116 may act as the pumping element of a total artificial heart. It is understood here that the motor 1114 creates a non-contact rotating magnetic field that couples with magnetic structures 1122 than are integrated into, or attached to, the wobble plate 1116.

Figure 14:
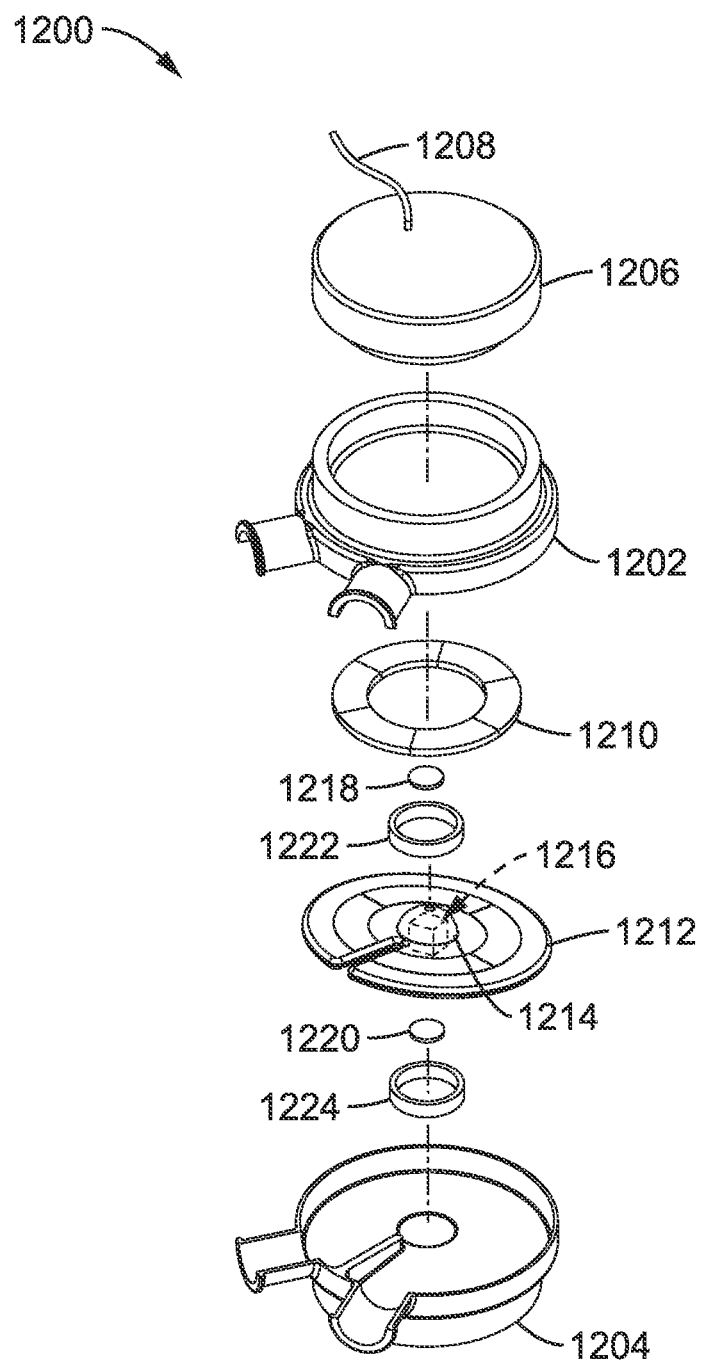
FIG. 14 is an exploded view of an embodiment of a pump similar to the pump shown in FIG. 10 and FIG. 11 but with a magnetically suspended spherical bearing on the wobble plate.

FIG. 14 is an exploded view of an embodiment of a nutating pump 1200 configured similarly to the pump shown in FIG. 11, but with a "magnetically suspended" spherical bearing configuration that is designed to "unload" the wobble plate and thereby reduce blood damage in the space between the spherical bearing and the bearing cups in the upper and lower housing sections previously described.

Figure 15:
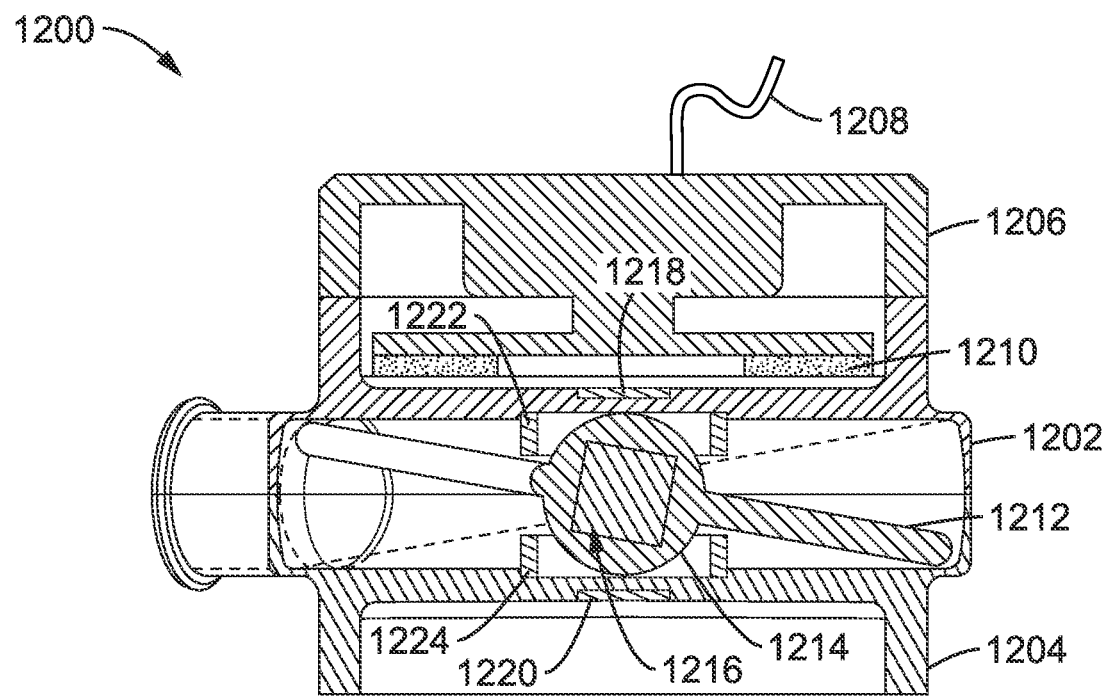
FIG. 15 is a cutaway view of an assembled pump according to FIG. 14.

The embodiment of FIG. 14 comprises an upper housing section 1202, a lower housing section 1204, a motor housing 1206 that contains a motor (not shown) connected to an external controller (not shown) by wires 1208, a magnet array 1210, and a wobble plate 1212. Notably, however, the interior of spherical bearing 1214 contains a magnet 1216. Furthermore, this embodiment includes a pair of disc-shaped magnets 1218, 1220 and a pair of ring magnets 1222, 1224. A disc-shaped magnet and a ring magnet would be positioned within the bearing cup (e.g., bearing cup 1226) of each housing section. This is illustrated further in the cutaway view of an assembled pump 1200 in FIG. 15 and the magnet configuration shown schematically in FIG. 16. The opposing polarities shown in FIG. 16 create magnetic fields that suspend the spherical bearing 1214 (and hence the wobble plate 1212) thereby removing at least some of the load in the gap between the spherical bearing and the hemispherical bearing cups.

Figure 16:
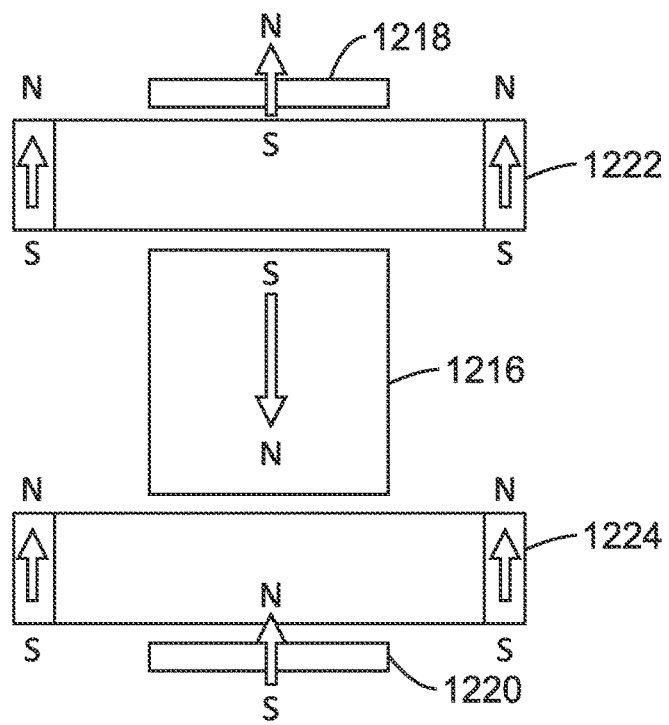
FIG. 16 is a schematic of an embodiment of a magnetic bearing suspension configuration for the pump of FIG. 14 and FIG. 15 that uses permanent magnets.

Note that the polarities of the magnetic poles shown in FIG. 16 are but one example and that a configuration with all of the polarities reversed would also function as intended. Furthermore, in alternative embodiments one of the magnets in the upper magnet combination 1218, 1222 could be eliminated. Similarly, one of the magnetics in the lower magnet combination 1220, 1224 could be eliminated.

Figure 17:
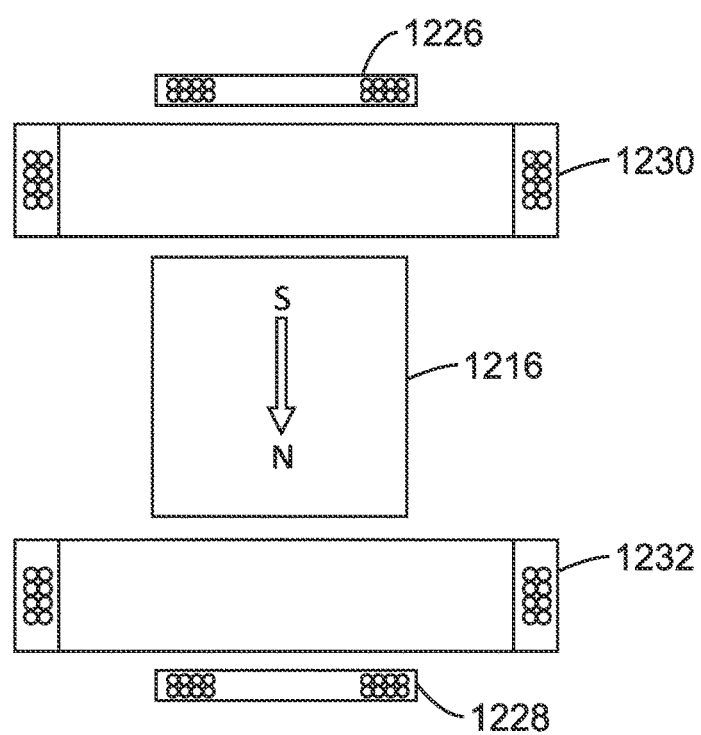
FIG. 17 is a schematic of an embodiment of a magnetic bearing suspension configuration for the pump of FIG. 14 and FIG. 15 that uses a combination of electromagnets and a permanent magnet.

FIG. 17 illustrates a variation of the magnet configuration shown in FIG. 16 where electromagnets are used. In this embodiment, the spherical bearing still contains a magnet 1216, but magnets 1218, 1220, 1222, and 1224 are replaced with electromagnets 1226, 1228, 1230, and 1232, respectively.

Means for Magnetic Coupling

It can be seen from the foregoing that a means for magnetically coupling a rotational output of the motor to the wobble disc uses non-contact magnetic forces. Typically, these are induced by a drive magnetic array rotated by a motor. Alternatively, an array of electromagnetic coils may produce a rotational magnetic field. As coils passing current are electromagnets, creating and alternating and sequencing the current in electromagnets would produce the similar effect on the nutating disc's permanent magnets.

In any event, the rotational magnetic field interacts with the wobble plate magnetic array in a manner to transfer power in a non-contact manner. This non-contact power transfer may be of high importance in certain applications, allowing for a hermetically sealed motor to power a sealed or unsealed power transfer device, such as a pump.

As can be seen by the preceding disclosure, this means for magnetic coupling is useful for transferring rotation input power to a substantially non-rotational output device, such as a pump.

Means for Substantially Restraining Wobble Plate Rotation

As previously described, an input motor generates a rotating magnetic field that is coupled to a wobble plate magnetic array. Such coupling would normally tend to induce a rotating motion of a coupled wobble plate, producing a rotational output motion. One aspect of this invention is to prevent such wobble plate rotational output motion. To prevent this undesirable rotational output motion, a means for substantially restraining rotation is used.

In the preceding disclosure, one means for substantially restraining rotation of the wobble disc include a pin on the wobble disc translating in a slot situated between a set of pillars. Alternatively, the wobble disc pivot may be situated about a pin, allowing for the wobble disc to "flap" in rotation about the pin. Another means for restraining rotation is shown with a partition that separates the inlet from the outlet flow disposed within a corresponding slot of the nutating disc, allowing the wobble plate to oscillate, or wobble, between an upper and lower extent. The edges of the slot and the surface of the partition would ideally be of materials conducive to providing a sliding bearing between the partition and the wobble plate. Various tribological combinations are possible such as sapphire on alumina, zirconia ceramic on stellite, or polymeric combinations. Hydrodynamic bearing surfaces or passive magnetic bearings could also be employed here to reduce friction and minimize blood damage.

Still another means for substantially restraining rotation of the wobble plate may be achieved by placing a non-circular wobble plate in a housing that allows for wobbling of the plate, but substantially restrains rotation of the plate.

Other means also include the use of passive magnetic bearing elements or hydrodynamic bearing surface especially designed to reduce blood damage by the contacting surfaces.

In all of these examples, rotation of the wobble plate is substantially eliminated. It is understood that for mechanical motion to exist, there must be clearances, or "play" between components to allow for motion. This minimal clearance, or "play" allows for miniscule rotation of the wobble plate, typically less than about 5, 1, 0.1, or 0.001 degrees or less of rotation.

IMPLEMENTATIONS, EMBODIMENTS AND EXAMPLES

As used herein, the term "implementation" is intended to include, without limitation, embodiments, examples, or other forms of practicing the technology described herein. From the description herein, it will be appreciated that the present disclosure encompasses multiple implementations of the technology which include, but are not limited to, the following:

A magnetic coupler apparatus, comprising: (a) a magnetic driver configured to generate a rotating magnetic field about a central axis, wherein the rotating magnetic field comprises magnetic poles of alternating polarity; (b) a wobble plate having a plurality of magnetic poles positioned to oppose the magnetic poles on the magnetic driver, the wobble plate configured to nutate about said axis without rotating; (c) the wobble plate having a centrally positioned spherical bearing configured to support the wobble plate when positioned in a support structure; and (d) an anti-rotation device configured to prevent rotation of the wobble plate about said axis; (e) wherein the rotating magnetic field from the magnetic driver causes the wobble plate to nutate through attraction and repulsion of the opposing magnetic poles.

The apparatus of any preceding or following implementation, wherein the magnetic driver comprises one or more electromagnetic coils configured to be sequentially energized to provide a rotating magnetic field.

The apparatus of any preceding or following implementation, wherein the magnetic driver comprises a rotatable drive plate having a plurality of magnetic poles, the drive plate configured to mechanically rotate about a central axis through the drive plate.

A magnetic coupler apparatus, comprising: (a) a rotatable drive plate having a plurality of magnetic poles, the drive plate configured to rotate about a central axis through the drive plate; (b) a wobble plate having a plurality of magnetic poles positioned to oppose the magnetic poles on the drive plate, the wobble plate configured to nutate about said axis without rotating; (c) the wobble plate having a centrally positioned spherical bearing configured to support the wobble plate when positioned in a support structure; and (d) an anti-rotation device configured to prevent rotation of the wobble plate about said axis; (e) wherein the opposing magnetic poles are configured such that rotation of the drive plate produces nutating motion of the wobble plate through attraction and repulsion of the opposing magnetic poles.

The apparatus of any preceding or following implementation, wherein the apparatus is a component of a pump.

The apparatus of any preceding or following implementation, wherein the apparatus is a component of an electrical generator.

The apparatus of any preceding or following implementation, wherein the apparatus is a component of a total artificial heart.

The apparatus of any preceding or following implementation, wherein the apparatus is a component of a left ventricular assist device.

A blood pump apparatus, comprising: (a) a magnetic coupler apparatus, the magnetic coupler apparatus comprising: (i) a magnetic driver configured to generate a rotating magnetic field about a central axis, wherein the rotating magnetic field comprises magnetic poles of alternating polarity; (ii) a wobble plate having a plurality of magnetic poles positioned to oppose the magnetic poles on the magnetic driver, the wobble plate configured to nutate about said axis without rotating; (iii) the wobble plate having a centrally positioned spherical bearing configured to support the wobble plate when positioned in a housing; and (iv) an anti-rotation device configured to prevent rotation of the wobble plate about said axis; (v) wherein the rotating magnetic field from the magnetic driver causes the wobble plate to nutate through attraction and repulsion of the opposing magnetic poles; (b) a housing assembly comprising: (i) an upper housing section; and (ii) a lower housing section; (iii) wherein the wobble plate is disposed between the upper housing section and the lower housing section; (iv) an upper bearing cup in the upper housing section; (v) a lower bearing cup in the lower housing section; (vi) wherein the spherical bearing is retained by the upper and lower bearing cups; and (vii) one or more pairs of access ports that are in fluid communication with an interior of the housing assembly.

The apparatus of any preceding or following implementation 20: wherein the wobble plate incudes a slot; wherein the wobble chamber housing includes a partition disposed within the slot; wherein the partition acts as a fluid separator; and wherein the anti-rotation device comprises the partition.

The apparatus of any preceding or following implementation, wherein the pump apparatus is biologically implantable to function as either an implantable ventricular assist device (IVAD) or a total artificial heart (TAH).

The apparatus of any preceding or following implementation, wherein the magnetic driver comprises one or more electromagnetic coils configured to be sequentially energized to provide a rotating magnetic field.

The apparatus of any preceding or following implementation, wherein the magnetic driver comprises a rotatable drive plate having a plurality of magnetic poles.

The apparatus of any preceding or following implementation, wherein the drive plate comprises a disc with an array of magnets on a face of said disc.

The apparatus of any preceding or following implementation, wherein the drive plate comprises a disc with an integrated array of magnets.

The apparatus of any preceding or following implementation, wherein the wobble plate comprises a disc with an array of magnets on a face of said disc.

The apparatus of any preceding or following implementation, wherein the wobble plate comprises a disc with an integrated array of magnets.

The apparatus of any preceding or following implementation: wherein the drive plate has an even number of alternating magnetic poles; wherein the wobble plate has an even number of magnetic poles; and wherein the number of magnetic poles on the drive plate differs from the number of magnetic poles on the wobble plate by at least two.

The apparatus of any preceding or following implementation, wherein the number of magnetic poles on the drive plate is greater than the number of magnetic poles on the wobble plate.

The apparatus of any preceding or following implementation, wherein the number of magnetic poles on the wobble plate is greater than the number of magnetic poles on the drive plate.

The apparatus of any preceding or following implementation, further comprising: upper and lower magnets positioned in said upper and lower bearing cups, respectively; and a magnet positioned internal to said spherical bearing; said magnets having pole orientations configured to provide magnetic fields which suspend the spherical bearing away from the upper and lower bearing cups and thereby reduce load on the wobble plate.

A magnetic coupler, comprising: (a) a magnetic driver; (b) a wobble chamber, comprising: (i) a wobble chamber housing; (ii) a wobble plate disposed within the wobble chamber housing; and (iii) an anti-rotation device, wherein rotation of the wobble plate is substantially eliminated; and (c) a magnetic coupling, comprising: (i) a wobble plate magnet disposed on the wobble plate; (ii) wherein the magnetic driver and the wobble plate magnet are sufficiently magnetically coupled such that a magnetic field rotation of the magnetic drive produces a movement of the wobble plate.

The magnetic coupler of any preceding or subsequent implementation, wherein the magnetic driver comprises one or more electromagnetic coils that produce a rotating magnetic field.

The magnetic coupler of any preceding or subsequent implementation, wherein the magnetic driver comprises one or more magnets disposed within or on a drive element.

The magnetic coupler of any preceding or subsequent implementation, wherein the drive element rotates about a drive shaft.

The magnetic coupler of any preceding or subsequent implementation, wherein the wobble chamber housing comprises: (a) an upper wobble chamber housing; and (b) a lower wobble chamber housing; (c) wherein the wobble plate is disposed between the upper wobble chamber housing and the lower wobble chamber housing.

The magnetic coupler of any preceding or subsequent implementation, wherein the wobble plate comprises: (a) a disc with an upper and lower substantial hemisphere disposed on respective sides centrally located on the disc; (b) wherein the upper and lower hemispheres together form a substantially spherical surface; (c) a slot extending from an outer perimeter of the disc substantially to the outer perimeter of the two hemispheres.

The magnetic coupler of any preceding or subsequent implementation, wherein the upper wobble chamber housing comprises: (a) an upper substantially conical interior; and (b) an upper substantially hemispherical race; (c) wherein the wobble plate upper hemisphere is spherically restrained by the upper hemispherical race.

The magnetic coupler of any preceding or subsequent implementation, wherein the lower wobble chamber housing comprises: (a) a lower substantially conical interior; and (b) a lower substantially hemispherical race; (c) wherein the wobble plate lower hemisphere is spherically restrained by the lower hemispherical race.

The magnetic coupler of any preceding or subsequent implementation, wherein after assembly of the upper wobble chamber housing to the lower wobble chamber housing, with the wobble plate therebetween, the wobble plate is free to nutate between the upper and lower conical interior upon rotation of the magnetic field of the magnetic drive.

The magnetic coupler of any preceding or subsequent implementation, further comprising: (a) a partition that extends from the upper wobble chamber to the lower wobble chamber; (b) wherein the partition slidably passes through the wobble plate slot; and (c) wherein the partition acts with the slot as the anti-rotation device.

The magnetic coupler of any preceding or subsequent implementation, wherein the magnetic driver is disposed externally to the wobble chamber.

The magnetic coupler of any preceding or subsequent implementation, wherein the wobble chamber further comprises: (a) one or more pairs of access ports, wherein the access ports are in fluid communication with an interior of the wobble chamber; and (b) a partition disposed within the wobble chamber, wherein the partition acts as a fluid separator between at least one of the pairs of access ports.

The magnetic coupler of any preceding or subsequent implementation, wherein the partition acts as the anti-rotation device.

The magnetic coupler of any preceding or subsequent implementation, wherein the movement of the wobble plate is selected from a set of movements comprising: a translational motion, and nutational motion.

The magnetic coupler of any preceding or subsequent implementation, wherein the magnetic driver and the wobble plate transfer power without other mechanical power transmission coupling.

The magnetic coupler of any preceding or subsequent implementation, wherein the wobble chamber further comprises: (a) two pairs of access ports, wherein the access ports are in fluid communication with an interior of the wobble chamber; and (b) a partition disposed within the wobble chamber, wherein the partition acts as a fluid separator between at least one of the pairs of access ports; (c) wherein the magnetic driver is hermetically sealed; and (d) wherein the magnetic driver and wobble chamber are biologically implantable to function as either an implantable ventricular assist device (IVAD) or a total artificial heart (TAH).

The magnetic coupler of any preceding or subsequent implementation, wherein the wobble plate is substantially a disc.

The magnetic coupler of any preceding or subsequent implementation, wherein the wobble plate further comprises a slot.

The magnetic coupler of any preceding or subsequent implementation, comprising: (a) a hermetically sealed motor; (b) a wobble disc; (c) means for magnetically coupling a rotational output of the motor to the wobble disc; and (e) means for substantially restraining rotation of the wobble disc.

The magnetic coupler of any preceding or subsequent implementation, comprising: (a) a motor, comprising: (i) a drive shaft that is rotated; and (ii) a drive disc attached to the drive shaft; (b) a pump, comprising: (i) a pump housing; (ii) an inlet port and an outlet port fluidly connected to the pump housing; (iii) a wobble plate disposed within the pump housing; and (iv) an anti-rotation device, wherein rotation of the wobble plate is substantially eliminated; and (c) a magnetic coupling, comprising: (i) a drive magnetic array disposed on the drive disc; (ii) a pump magnetic array disposed on the wobble plate; (iii) wherein the drive magnetic array and the pump magnetic array are sufficiently magnetically coupled such that the wobble plate nutates upon a rotation of the drive shaft.

The magnetic coupler of any preceding or subsequent implementation, wherein the pump acts as a nutating implanted vascular assist device.

The magnetic coupler of any preceding or subsequent implementation, wherein: (a) when a fluid is supplied to the outlet port, the wobble plate wobbles; and (b) the pump magnetic array magnetically drives the drive magnetic array; (c) whereby a rotation is induced in the motor drive shaft; and (d) whereby an output power is generated by the motor.

The magnetic coupler of any preceding or subsequent implementation, wherein the drive magnetic array and the pump magnetic array have an even number of poles on each array, and there is a difference in pole count between the magnetic array and the pump array of at least one pair.

The magnetic coupler of any preceding or subsequent implementation, wherein the ratio of motion between the drive magnetic array and the pump magnetic array can be determined by a count of the poles of the drive magnetic array and the pump magnetic array.

A non-contacting magnetic drive for converting rotary motion to nutating motion.

A non-contacting magnetic drive for a nutating circulatory assist device.

A non-contacting magnetic drive for generating power from fluid flow.

A non-contacting magnetic drive according to any preceding implementation having electromagnetic elements.

A magnetic actuator, comprising: (a) an array of permanent magnets which reside on first and second adjacent discs, wherein there are an even number of poles on each disc and there is a difference in pole count of at least one pair; (b) wherein the first disc is constrained to rotate about an axis perpendicular to the plane of the disc; and (c) wherein the second disc is constrained to allow a nutation motion about its center.

The magnetic actuator of any preceding implementation, wherein rotary motion of the first disc produces a wave of flux with interacts with the magnets of the second disc to create a nutating motion.

The magnetic actuator of any preceding implementation, wherein nutating motion of the second disc produces a wave of flux with interacts with the magnets of the first disc to produce rotary motion in the first disc.

Yet another embodiment would integrate a number of axial actuators to drive a pump, wherein the pump would include a nutating disc mounted within a cavity. There would be at least one inlet and one outlet and a wall between the inlet and outlet. The nutation may be non-rotational. The nutating disc would function as a positive displacement, valveless pump. In this embodiment, the pump would include a radial inlet and outlet, with a dividing wall between the radial inlet and outlet extending from the top and bottom of a housing. Magnetic action would drive the nutation. Two sets of magnet arrays, one rotating outside of the horizontal surface of the housing, and one on the disc, would interact to produce a nutating motion in the disc.

In another embodiment, the disc would function as two separate pumps. An inlet and outlet are located on the horizontal surfaces of the top and bottom housing such that each half of the housing is a separate pump. The plate would be actuated by a rotating magnet array outside the housing interacting with the magnet array on the plate. In a further embodiment, an inlet is positioned on a horizontal surface of the housing and an outlet is positioned on the radial surface of the housing. At least two magnet arrays are used to produce nutating motion in the plate. The technology can also work in reverse; namely producing nutating motion in the disc will in turn produce rotatory motion in another disc. There are several features and advantages which include but are not limited to the following:

1. There is no need for the orbiting shaft to extend from the nutating disc to the external components.
2. There is no need for shaft sealing, consequently, hermetic capability.
3. Motion between the nutating disc and the housing is a result of magnetic forces produced by an array of permanent magnets.
4. There is one magnetic array in the disc and at least one magnetic array in the external housing.
5. The orientation of the magnets is axial rather than radial.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A magnetic coupler apparatus, comprising:
   (a) a magnetic driver configured to generate a rotating magnetic field about a central axis, wherein the rotating magnetic field comprises magnetic poles of alternating polarity;
   (b) a wobble plate having a plurality of magnetic poles positioned to oppose the magnetic poles on the magnetic driver, the wobble plate configured to nutate about said axis without rotating;
   (c) the wobble plate having a centrally positioned spherical bearing configured to support the wobble plate when positioned in a support structure; and
   (d) an anti-rotation device configured to prevent rotation of the wobble plate about said axis;
   (e) wherein the rotating magnetic field from the magnetic driver causes the wobble plate to nutate through attraction and repulsion of the opposing magnetic poles.

2. The apparatus of claim 1, wherein the magnetic driver comprises one or more electromagnetic coils configured to be sequentially energized to provide a rotating magnetic field.

3. The apparatus of claim 1, wherein the magnetic driver comprises a rotatable drive plate having a plurality of magnetic poles, the drive plate configured to mechanically rotate about a central axis through the drive plate.

4. The apparatus of claim 1, wherein the apparatus is a component of a pump.

5. The apparatus of claim 1, wherein the apparatus is a component of an electrical generator.

6. The apparatus of claim 1, wherein the apparatus is a component of a component of a total artificial heart.

7. The apparatus of claim 1, wherein the apparatus is a component of a left ventricular assist device.

8. A magnetic coupler apparatus, comprising:
   (a) a rotatable drive plate having a plurality of magnetic poles, the drive plate configured to rotate about a central axis through the drive plate;
   (b) a wobble plate having a plurality of magnetic poles positioned to oppose the magnetic poles on the drive plate, the wobble plate configured to nutate about said axis without rotating;
   (c) the wobble plate having a centrally positioned spherical bearing configured to support the wobble plate when positioned in a support structure; and
   (d) an anti-rotation device configured to prevent rotation of the wobble plate about said axis;
   (e) wherein the opposing magnetic poles are configured such that rotation of the drive plate produces nutating motion of the wobble plate through attraction and repulsion of the opposing magnetic poles.

9. The apparatus of claim 8, wherein the drive plate comprises a disc with an array of magnets on a face of said disc.

10. The apparatus of claim 8, wherein the drive plate comprises a disc with an integrated array of magnets.

11. The apparatus of claim 8, wherein the wobble plate comprises a disc with an array of magnets on a face of said disc.

12. The apparatus of claim 8, wherein the wobble plate comprises a disc with an integrated array of magnets.

13. The apparatus of claim 8:
   wherein the drive plate has an even number of alternating magnetic poles;
   wherein the wobble plate has an even number of magnetic poles; and
   wherein the number of magnetic poles on the drive plate differs from the number of magnetic poles on the wobble plate by at least two.

14. The apparatus of claim 13, wherein the number of magnetic poles on the drive plate is greater than the number of magnetic poles on the wobble plate.

15. The apparatus of claim 13, wherein the number of magnetic poles on the wobble plate is greater than the number of magnetic poles on the drive plate.

16. The apparatus of claim 8, wherein the apparatus is a component of a pump.

17. The apparatus of claim 8, wherein the apparatus is a component of an electrical generator.

18. The apparatus of claim 8, wherein the apparatus is a component of a total artificial heart.

19. The apparatus of claim 8, wherein the apparatus is a component of a left ventricular assist device.

20. A blood pump apparatus, comprising:
   (a) a magnetic coupler apparatus, the magnetic coupler apparatus comprising:
      (i) a magnetic driver configured to generate a rotating magnetic field about a central axis, wherein the rotating magnetic field comprises magnetic poles of alternating polarity;
      (ii) a wobble plate having a plurality of magnetic poles positioned to oppose the magnetic poles on the magnetic driver, the wobble plate configured to nutate about said axis without rotating;
      (iii) the wobble plate having a centrally positioned spherical bearing configured to support the wobble plate when positioned in a housing; and
      (iv) an anti-rotation device configured to prevent rotation of the wobble plate about said axis;
      (v) wherein the rotating magnetic field from the magnetic driver causes the wobble plate to nutate through attraction and repulsion of the opposing magnetic poles;
   (b) a housing assembly comprising:
      (i) an upper housing section; and
      (ii) a lower housing section;
      (iii) wherein the wobble plate is disposed between the upper housing section and the lower housing section;
      (iv) an upper bearing cup in the upper housing section;
      (v) a lower bearing cup in the lower housing section;
      (vi) wherein the spherical bearing is retained by the upper and lower bearing cups; and (vii) one or more pairs of access ports that are in fluid communication with an interior of the housing assembly.

21. The apparatus of claim 20:
wherein the wobble plate incudes a slot;
wherein the wobble chamber housing includes a partition disposed within the slot;
wherein the partition acts as a fluid separator; and
wherein the anti-rotation device comprises the partition.

22. The apparatus of claim 20, wherein the pump apparatus is biologically implantable to function as either an implantable ventricular assist device (IVAD) or a total artificial heart (TAH).

23. The apparatus of claim 20, wherein the magnetic driver comprises one or more electromagnetic coils configured to be sequentially energized to provide a rotating magnetic field.

24. The apparatus of claim 20, wherein the magnetic driver comprises a rotatable drive plate having a plurality of magnetic poles.

25. The apparatus of claim 24, wherein the drive plate comprises a disc with an array of magnets on a face of said disc.

26. The apparatus of claim 24, wherein the drive plate comprises a disc with an integrated array of magnets.

27. The apparatus of claim 24:
wherein the drive plate has an even number of alternating magnetic poles;
wherein the wobble plate has an even number of magnetic poles; and
wherein the number of magnetic poles on the drive plate differs from the number of magnetic poles on the wobble plate by at least two.

28. The apparatus of claim 27, wherein the number of magnetic poles on the drive plate is greater than the number of magnetic poles on the wobble plate.

29. The apparatus of claim 27, wherein the number of magnetic poles on the wobble plate is greater than the number of magnetic poles on the drive plate.

30. The apparatus of claim 20, wherein the wobble plate comprises a disc with an array of magnets on a face of said disc.

31. The apparatus of claim 20, wherein the wobble plate comprises a disc with an integrated array of magnets.

32. The apparatus of claim 20, further comprising:
upper and lower magnets positioned in said upper and lower bearing cups, respectively; and
a magnet positioned internal to said spherical bearing;
said magnets having pole orientations configured to provide magnetic fields which suspend the spherical bearing away from the upper and lower bearing cups and thereby reduce load on the wobble plate.

* * * * *